United States Patent
Rosenberg

(10) Patent No.: US 7,426,262 B2
(45) Date of Patent: Sep. 16, 2008

(54) METHOD AND ARRANGEMENT FOR LOOP TEST OF A DISTURBED LINE

(75) Inventor: Jonas Rosenberg, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 322 days.

(21) Appl. No.: 10/556,705

(22) PCT Filed: Apr. 8, 2004

(86) PCT No.: PCT/SE2004/000566

§ 371 (c)(1),
(2), (4) Date: Nov. 10, 2005

(87) PCT Pub. No.: WO2004/100513

PCT Pub. Date: Nov. 18, 2004

(65) Prior Publication Data

US 2006/0251221 A1    Nov. 9, 2006

Related U.S. Application Data

(60) Provisional application No. 60/469,658, filed on May 12, 2003.

(51) Int. Cl.
*H04M 1/24* (2006.01)
*H04M 3/08* (2006.01)
*H04M 3/22* (2006.01)

(52) U.S. Cl. ............... 379/22.01; 379/1.03; 379/28; 379/29.01

(58) Field of Classification Search ........... 379/1.01, 379/1.03, 1.04, 22, 22.01, 23, 24, 27.01, 379/27.03, 28, 29.01, 31, 27.02, 27.04, 29.05, 379/29.06; 375/222, 224, 231; 324/527, 324/533
See application file for complete search history.

(56) References Cited

U.S. PATENT DOCUMENTS

| 6,584,176 | B2 * | 6/2003 | Murphree et al. ............. 379/24 |
| 6,876,725 | B2 * | 4/2005 | Rashid-Farrokhi et al. . 379/1.04 |
| 7,069,165 | B2 * | 6/2006 | Rosenberg et al. ............ 702/85 |
| 2005/0008068 | A1 * | 1/2005 | Stegherr ..................... 375/222 |

FOREIGN PATENT DOCUMENTS

DE    10154937 C1    11/2002

* cited by examiner

*Primary Examiner*—Quoc D Tran

(57) ABSTRACT

The invention refers to single-ended test of a loop (2, 3). A test device (TD1) is connected to a remote device (3) via a line (2). The remote device is powered on and transmits intermittently handshake signals (HS1), which can disturb the loop test. A receiving and calculating unit (RE1) detects the handshake signals (HS1) and orders a sending unit (SD1) to send a halting signal (NAK-EF) to the remote device. The latter is halted for predetermined silent period of time, during which the test or a part of it is performed. If required the halting of the handshake signals is repeated. The test device sends a broadband loop test signal (S1) and receives a reflected signal (S2) during the silent period. A frequency dependent echo transfer function is generated from the signals (S1, S2) and is used for generating desired properties of the line (2) such as its length (L).

11 Claims, 6 Drawing Sheets

METHOD AND ARRANGEMENT FOR LOOP TEST OF A DISTURBED LINE

CROSS-REFERENCE TO RELATED APPLICATION

This application is a non-provisional under 35 U.S.C. 119 (e) of U.S. provisional application No. 60/469,658 filed on May 12, 2003 and is also a continuation under 35 U.S.C. 120 of PCT International Application number PCT/SE2004/000566 filed on Apr. 08, 2004, the disclosures of which is incorporated herein by reference.

TECHNICAL FIELD OF THE INVENTION

The present invention relates to a method and an arrangement in the area of single-ended test of a signal line being subjected to disturbances from a remote end device.

DESCRIPTION OF RELATED ART

In today's telecommunication it is essential from an economical point of view to use existing copper wires for broadband transmission. These copper wires, often called twisted-pair copper loops or copper access lines, have among themselves very different properties from a broadband point of view. Telecom operators therefore have a great interest in testing the properties of the lines to be able to fully utilize their transmission capacity. The abovementioned is discussed in an article by Walter Goralski: "xDSL Loop Qualification and Testing", IEEE Communications Magazine, May 1999, pages 79-83. The article also discusses testing possibilities and test equipment.

The transmission properties of copper lines are more closely discussed in an article by José E. Schutt-Ainé: "High-Frequency Characterization of Twisted-Pair Cables", IEEE Transactions on Communications, Vol. 49, No. 4, April 2001. Propagation parameters of high bit rate digital subscriber twisted-pair cables are extracted by a wave propagation method model. The frequency dependence in the properties of the transmission line and the influence of the skin effect on these are studied.

Testing the transmission properties of a line can be performed by sending a test signal from one end of the line and measure it at the other end, so called double end test. That method is labour intensive and expensive. A more frequently used method is to send a test signal from one end of the line and measure on the reflected pulse, so called Single-Ended Loop Testing, SELT. In an article by Stefano Galli and David L Waring: "Loop Makeup Identification Via Single Ended Testing: Beyond Mere Loop Qualification", IEEE Journal on Selected Areas in Communications, Vol. 20, No. 5, June 2002, is discussed the influence of different types of line discontinuities and generated echoes in connection with single-ended testing. A mathematical method for handling the echoes is presented and also an experimental validation of the method.

It is an obvious choice from a technical point of view to use a laboratory-type measurement device for performing a SELT. Using such a device is however expensive. Irrespective of that, the measurement can be influenced by disturbances which arises when a Customer Premises Equipment (CPE), that is connected to the remote end of the line, is trying to perform a handshake procedure. The handshake procedure makes it difficult to analyse the measured echo-frequency response and the normal noise on the line.

In single-ended testing it is advantageous to, instead of the laboratory device, use a transceiver as a part of a measurement device for the loop under test. The broadband communication transceiver is however no perfect voltage generator but introduces distortion in the measurement. How to remove this distortion is discussed in a standardization paper by Thierry Pollet:"How is G.selt to specify $S_{11}$ (calibrated measurements)?", ITU Telecommuni-cation Standardization Sector, Temporary Document OJ-091; Osaka, Japan 21-25 October, 2002. A calibration method is presented, based on a one port scattering parameter $S_{11}$, that includes transceiver parameters which are generated during a calibration. Also in a standardization paper by Thierry Pollet: "Minimal information to be passed between measurement and interpretation unit", ITU Telecommunication Standardization Sector, Temporary Document OC-049; Ottawa, Canada 5-9 August, 2002, the one port scattering parameter $S_{11}$ is discussed. Also when using the transceiver for the SELT the remote CPE can disturb the measurement by trying to perform a handshake procedure.

SUMMARY OF THE INVENTION

The present invention is concerned with the abovementioned problem how to avoid the influence of a handshake procedure on a single-ended loop test of a copper access line connected to a CPE. As long as the line stays inactivated the powered on CPE will try to perform a handshake procedure transmitting intermittent handshake signals. Due to these handshake signals it is difficult to analyse a measured echo-frequency response when the connected CPE modem is powered on.

Another problem arises when a transceiver is utilized in the single-ended test of the line. The problem is how to also compensate for the influence on the SELT measurement of the transceiver itself.

Still a problem is how to generate and store transceiver values for the compensation.

The problem is solved in the following manner. In the handshake procedure the CPE transmits intermittent narrow-band signals, handshake tones, of predetermined frequencies. The handshake tones are detected by the device performing the SELT measurement and the handshake tones are halted for a time interval. During this interval the SELT measurement is performed, if necessary after repeated halts of the handshake tones.

When using the transceiver for the SELT measurement, the problems in connection with that are solved by calibrating a test transceiver, which is a typical broadband communication transceiver, and generate transceiver model values. These values are stored and are used in the transceiver for communication purposes, which is connected to the loop to be tested. A test signal, as reflected by the loop, is measured at the communication transceiver, giving a loop test result. The influence on this result by the communication transceiver itself is compensated for with the aid of the stored transceiver model values.

A purpose with the present invention is to improve the SELT measurement of the access line, when the CPE sends its intermittent handshake signals.

Another purpose with the present invention is to compensate for the influence of a transceiver on the SELT testing of the line.

Still a purpose is to generate and store transceiver values for the compensation.

An advantage with the present invention is that the SELT measurement of the access line can be performed when the CPE sends its intermittent handshake lines.

Another advantage with the invention is that the influence of the transceiver on the SELT measurement of a copper access line can be compensated for.

A further advantage is that transceiver values for the compensation can be generated and stored and can be applied for all standard broadband transceivers, based on the same hardware as the tested one. Hence a costly procedure of calibrating an actual transceiver will be eliminated.

Still an advantage is that the generated transceiver values have an easily understandable meaning.

Still another advantage is that the test transceiver can be any one of the transceivers used for communication purposes.

The invention will now be more closely described with the aid of embodiments and with reference to the enclosed drawings.

DETAILED DESCRIPTION OF EMBODIMENTS

Figure 1:
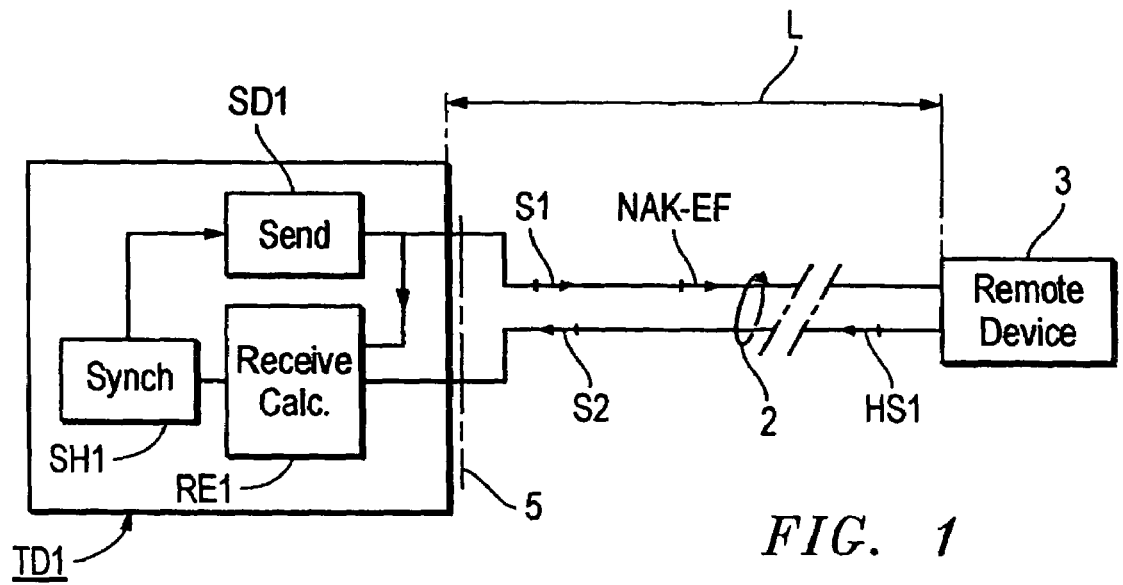
FIG. 1 shows a simple block schematic over a test device and a transmission line.

FIG. 1 shows a simple block schematic over a test device TD1 at a central office, connected to a remote device 3 at a customer's premises via a digital subscriber line 2 (DSL). The line is seen from the end of the test device, and this end is called the near end of the line while the other end at the device 3 is denoted as the remote end. The line 2 is a conventional copper line of a length L, which has certain properties, such as signal attenuation in different frequency ranges. The test device has a sending device SD1, a receiving device RE1 and a synchronizing device SH1. The latter is connected to the sending device SD1, which in turn is connected to the line 2 and to the receiving device RE1.

As mentioned above it is essential for a network operator to be able to utilize the already existing copper line 2 for the broadband transmission. The operator therefore must know the line properties, such as the length L, signal attenuation and transmission capacity. These properties can normally be determined after a measurement, which is advantageously performed from the near end of the line as a so called Single-Ended Loop Test, SELT. The parameters are related to a line input impedance $Z_{in}(f)$ which can be evaluated using transmitted and reflected test signals.

The test device TD1 transmits such a test signal, a broadband loop test signal S1, which is reflected by the remote device 3 and is measured by the test device as a reflected signal S2. With the aid of a quotient S2/S1 parameters of the line 2 can be determined, as will be described in detail below. The measurement of the reflected signal S2 can however be disturbed by the remote device 3, which tries to perform a handshake procedure. To avoid this disturbance, first the presence of a handshake signal must be detected.

During the handshake procedure the remote device 3 intermittently sends a narrowband handshake signal HS1, which can interfere with the signal S2 and render the line measurement more difficult. The interfering handshake signal can however be detected. The loop test signal S1, used in the present embodiment, has a frequency in the range of 0-1104 kHz or higher. It is based on a measurement signal that has a number of orthogonal frequency points coinciding with the so called Discrete Multi Tone signal. This signal is used for modulation purposes in the ADSL standard ITU-T G.992.1 The test device, that measures the reflected signal S2 in this frequency range 0-1104 kHz, therefore can be used for the detection of the handshake signal. A noise signal in the range of 0-276 kHz or higher is also to be measured by the test device and also this measurement can be used for detecting the handshake signal HS1. The handshake tones in standardized DSL transmission due to the ITU-T standard G.994.1 uses narrowband signals modulated with plain DPSK scheme. Due to its limited bandwidth it is fairly simple to distinguish the individual frequency position of these handshake signals. In for example ADSL there are three sets of mandatory upstream handshake tones, based on a frequency $f_0$=4.3125 kHz:

ADSL Annex A : N=[9, 17, 25]
ADSL Annex B : N=[37, 45, 53]
ADSL Annex C : N=[7, 9]

The handshake tones have the frequency $F=N \times f_0$. One or more of the above tones may be transmitted during handshake for one specific annex setting.

Figure 2:
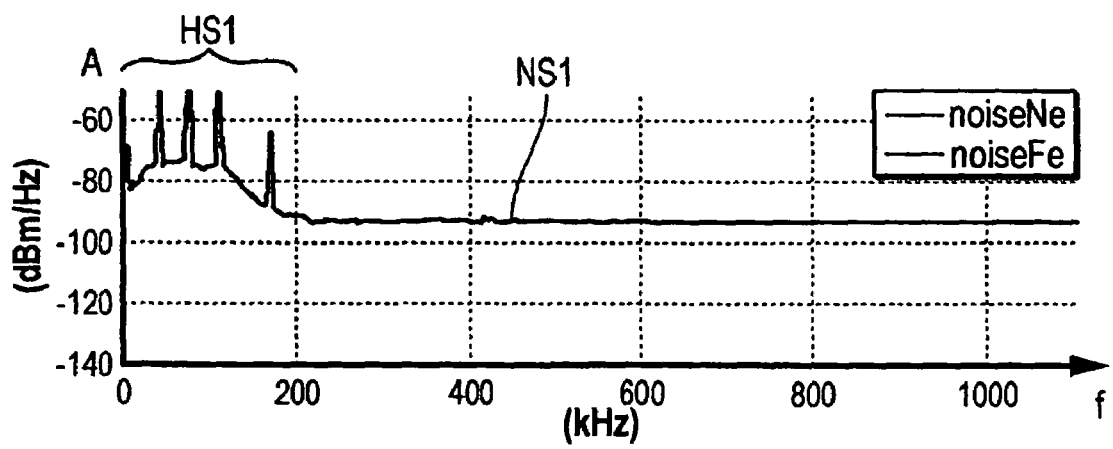
FIG. 2 shows a frequency diagram with handshake tones.

The above handshake signals can be observed as narrowband disturbance in a noise measurement, delivering a mean value noise floor over frequency. In FIG. 2 is shown handshake tone disturbance in such a noise measurement. The figure is a diagram with the frequency $f$ in kHz on the abscissa and the signal level A in dBm/Hz on the ordinate. In a frequency range from about 200 kHz and higher the noise NS1 has a rather constant level. In the range 0-200 kHz the handshake signal HS1 can be observed. The figure shows that the particular remote device 3 connected has four tones active during the handshake. By identifying these frequency tones in the spectra it appears that it is an ADSL Annex A set, fulfilling the mandatory set of handshake tones, and with an optional additional tone from Annex B.

Further, handshake tones are transmitted following a standardized time scheme. The signals are not continuous but sent with periodic intervals leaving the line silent in between. For example the standard ITU-T G994.1 states:

"If a NAK-EF message is received in any state, the receiving station shall return immediately to the initial G.994.1 state (R-SILENT0 for an HSTU-R, C-SILENT1 for an HSTU-C) and remain silent for a minimum period of 0.5 s. It may then initiate another G.994.1 session."

This means that if an operator wants to perform a SELT measurement of the line 2 from the test device TD1, the handshake procedure from the remote device 3 can be halted. The handshake signals HS1, e.g. as described in FIG. 2, are indicated by the receiving device RE1. The synchronizing device SH1 orders the sending device SD1 to send the NAK-EF message, which halts the handshake tones HS1 for a time interval of at least 0.5 seconds. During this interval the loop test signal S1 is sent from the sending device on order from the synchronizing device SH1 and the reflected signal S2 is received in the receiving device RF1. To get full information about the line 2 it may be necessary to resend the loop test signal S1 and repeat the SELT measurement procedure. The complete measurement will then follow FIG. 3, which is a diagram with the time T on the abscissa, showing SELT measurement synchronized with handshake signals. The figure shows the handshake signals HS1 followed by the NAKEF message and interleaving time intervals TI1, used for the SELT measurement. It should be noted that it is only the SELT measurement that is to be performed in the time intervals TI1. The calculations concerning the line properties based on the SELT measurement can go on continuously.

As an alternative to the standard ITU-T G.994.1 there is an ADSL standard ANSI T1E1.413 using a different method for handshake.

Figure 4:
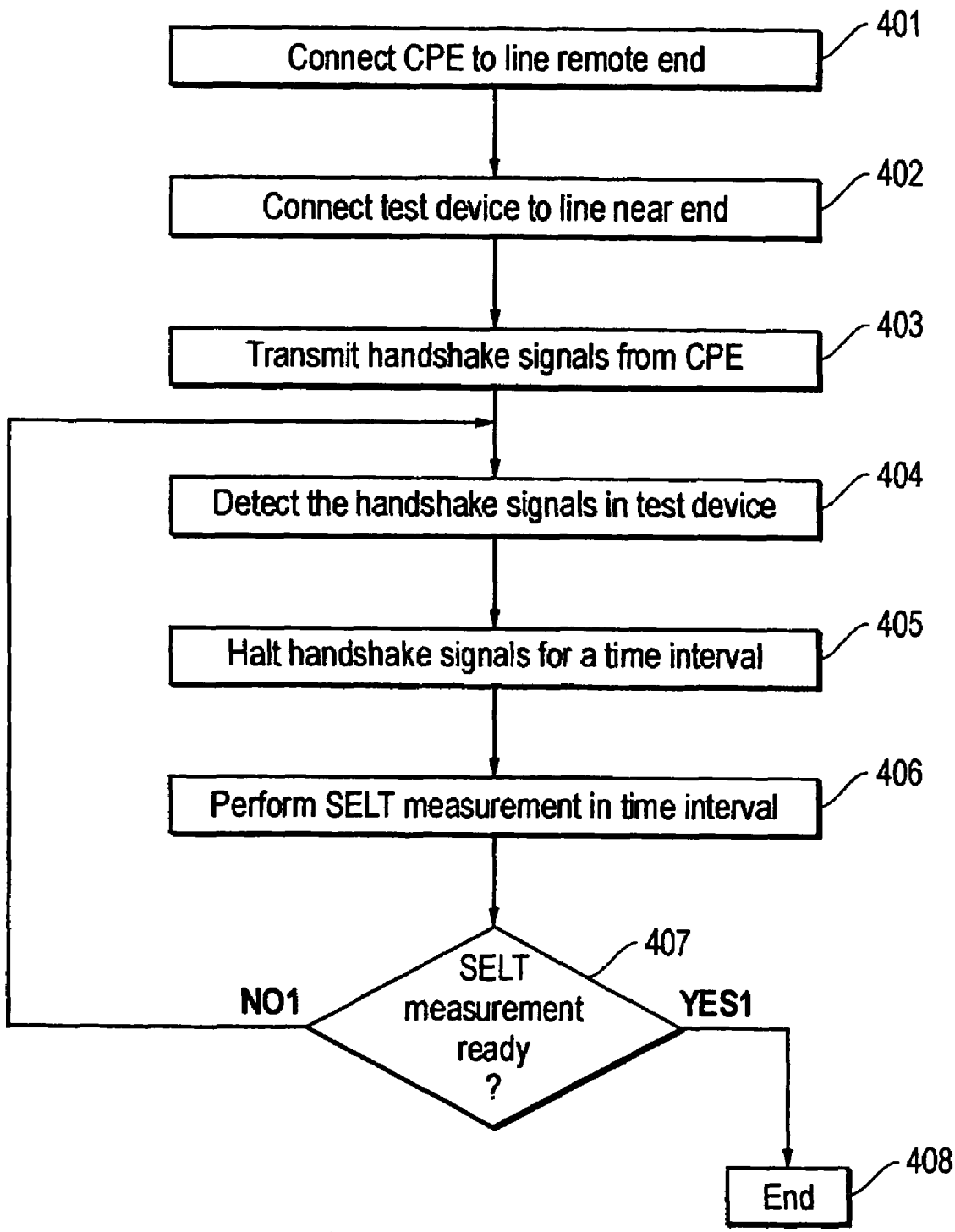
FIG. 4 shows a flow chart for SELT measurement.

The SELT measurement method described above will be summarized in connection with a flow chart in FIG. 4. In a step 401 the customer premises equipment CPE, the remote end device 3, is connected to the remote end of the line 2. The test device is connected to the near end of the line in a step 402 and in a step 403 the handshake signals HS1 are transmitted from the CPE. In a step 404 the handshake signals HS1 are indicated in the receiving device RE1. The handshake signals are halted for the time interval TI1 of predetermined duration in a step 405. In a next step 406 the SELT measurement is performed and in a step 407 it is investigated whether the SELT measurement is ready. In an alternative NO1 the method step 404 is repeated with an indication of the handshake signals. Then the method steps 405, 406 and 407 are repeated until the alternative YES1 after the step 407 is the actual one and the procedure ends in a step 408.

Below will be described in an embodiment how the single-ended loop test, the SELT, is performed.

Figure 5:
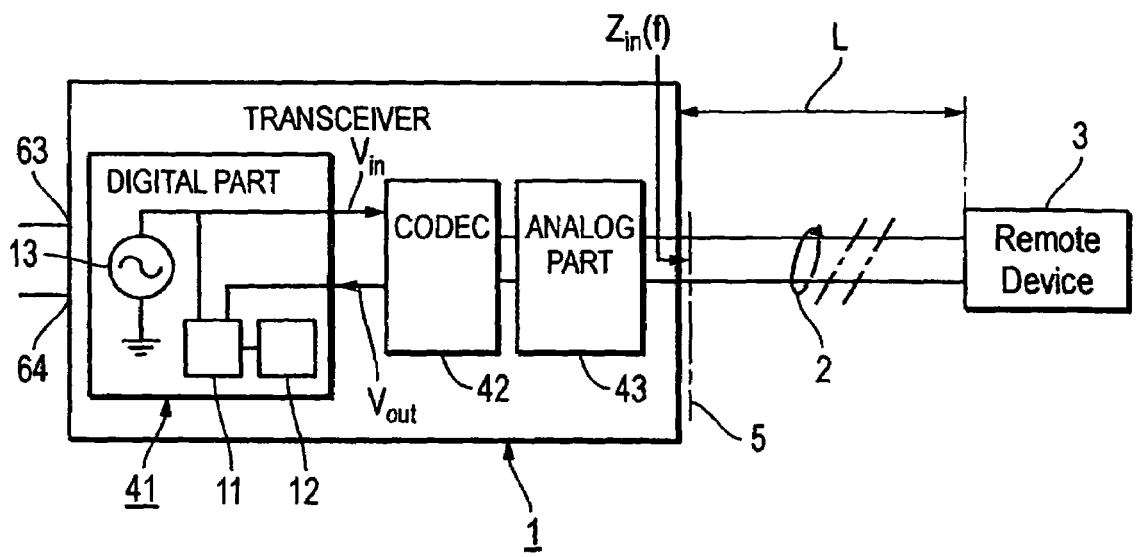
FIG. 5 shows a simple block schematic over a transceiver and the line.

In FIG. 5 is shown a transceiver 1 connected to the remote device 3 via the line 2. The transceiver is suitable for communication purposes and is described such that the SELT measurement can be explained. The transceiver 1 includes a digital part 41, a codec 42 and an analog part 43, the so called Analog Front End AFE. The digital part includes in turn a digital signal generator 13 and a computational device 11 interconnected with a memory device 12. The transceiver 1 also has an input 63 and an output 64. The generator, which is connected to the computational device 11, sends a broadband input loop test signal $v_{in}$ to the remote device 3 via the codec 42, the analog part 43 and the line 2. A reflected broadband loop test signal $v_{out}$ is received in the computational device from the line 2 via the analog part and the codec.

The broadband loop test signal $v_{in}$, sent for such measuring purposes, is reflected back over the line 2 and is noted as the loop test signal $v_{out}$. As will be described below, the signals $v_{in}$ and $v_{out}$ are used in the determining of the properties of the line 2.

What the operator in fact needs to know is the input impedance $Z_{in}(f)$ of the line 2 including the remote device 3, measured from a transceiver interface 5 and being independent of the transceiver 1 itself. A first step in getting the required line properties is to generate an echo transfer function $H_{echo}(f)$ for the actual line 2. This is calculated by performing a frequency translation of the broadband signals $v_{in}$ and $v_{out}$, resulting in signals $V_{in}(f)$ and $V_{out}(f)$ in the frequency domain. The transfer function is generated by the relationship $$H_{echo}(f)=V_{out}(f)/V_{in}(f) \quad (1)$$

in which the frequency is denoted by $f$.

Naturally, the function $H_{echo}(f)$ includes properties of the transceiver 1. Below it will be described by an example how the required line properties of the line 2 can be obtained with the aid of the frequency dependent echo transfer function $H_{echo}(f)$. First, the transceiver analog part 43 will be described somewhat more in detail in connection with FIG. 6. This is to throw light upon the difficulties in characterizing the transceiver 1 in a simple manner.

Figure 6:
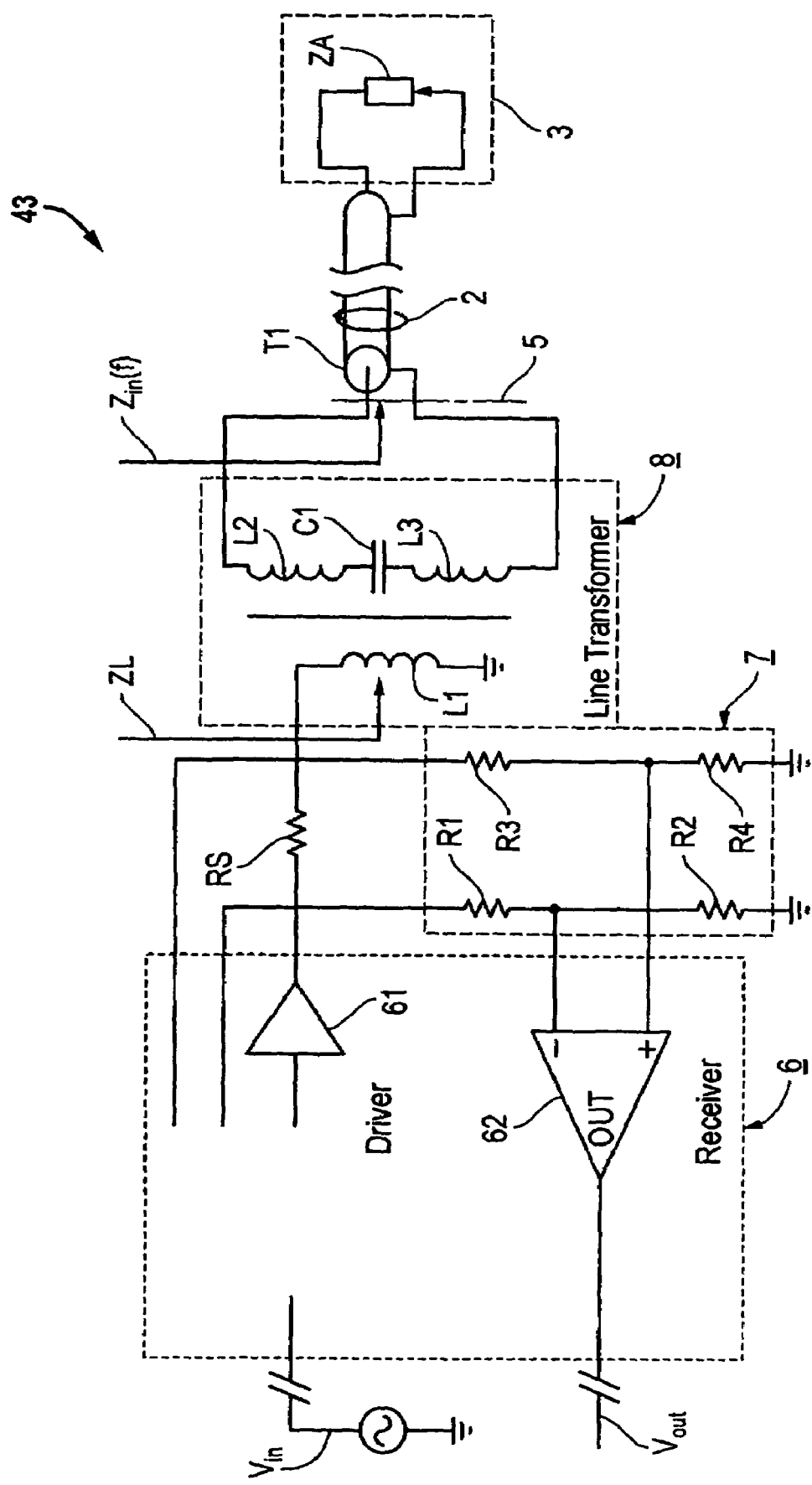
FIG. 6 shows a somewhat more detailed block schematic over a part of the transceiver and the line.

FIG. 6 is a simplified block diagram over the analog transceiver part 43 and the line 2 of FIG. 5, yet somewhat more detailed than in that figure. The analog part 43 includes an amplifier block 6, a hybrid block 7, a sense resistor RS and a line transformer 8. The amplifier block 6 has a driver 61 with its input connected to the digital generator 13 via the codec 42, not shown. I also has a receiver 62 receiving signals from the line 2 and having its output connected to the transceiver digital part 41, not shown. The driver output is connected to the sense resistor RS, the terminals of which are connected to the hybrid block 7. The latter has four resistors R1, R2, R3 and R4 and is connected to inputs of the receiver 62. The line transformer 8 has a primary winding L1 and two secondary windings L2 and L3 interconnected by a capacitor C1. The primary winding L1 is connected to the sense resistor RS and the secondary windings L2 and L3 are connected to the line 2. The frequency dependent line input impedance at the interface 5 is denoted $Z_{in}(f)$ and the input impedance at the primary side of the transformer is denoted ZL. The termination of the far-end of the line 2, the remote device 3, is represented by an impedance ZA.

The signal $v_{in}$, now in analog form from the codec 42, is amplified in the driver block 61. The output impedance of the driver is synthezised by the feedback loop from the sense resistor RS. The line transformer 8 has a voltage step-up from the driver to the loop. The capacitor C1 has a DC-blocking function. The transformer and the capacitor act as a high pass filter between the driver 61/receiver 62 and the loop 2, 3 with a cut-off frequency around 30 kHz. No galvanic access to the loop is possible in this case.

In the present description a frequency-domain model of the echo transfer function $H_{echo}(f)$ is used to calculate the frequency dependent input impedance $Z_{in}(f)$ of the loop 2 and 3, as seen by the transceiver 1 at the interface 5. The input impedance can then be used for calculating several loop qualification parameters. This frequency-domain model of the echo transfer function $H_{echo}(f)$ includes three parameters $Z_{h0}(f)$, $Z_{hyb}(f)$ and $H_{\infty}(f)$ which relate to the transceiver 1. The parameters, transceiver model values, fully describe the transceiver from this point of view.

The parameters $Z_{h0}(f)$, $Z_{hyb}(f)$ and $H_{\infty}(f)$ are originally deduced analytically from the circuits of the transceiver. Some minor simplifications have been made in the analysis, but the model has proved to be very accurate. In the enclosed Appendix 1, "Simulation of the echo transfer function for DAFE708" it is shown how the model of the echo transfer function $H_{echo}(f)$ is derived.

The values of the parameters are normally not calculated directly from the component values of the transceiver, but are generated from measurements in a calibration process, as will be described below.

In the earlier mentioned standardization paper "How is G.selt to specify $S_{11}$ (calibrated measurements)?" the scattering parameter $S_{11}$ is expressed with three parameters C1, C2 and C3 for the transceiver. These parameters should not be confused with the transceiver model values $Z_{h0}(f)$, $Z_{hyb}(f)$ and $H_{\infty}(f)$ of the present description. The parameters C1, C2 and C3 are dimensionless quantities and are not given any concrete meaning, although they are successfully used to model the transceiver. The transceiver model values of the present description are recognized in the analysis and can be interpreted directly:

The value $H_\infty(f)$ is the frequency dependent echo transfer function for the transceiver 1 with open connection to the line 2, i.e. when the line impedance is of unlimited magnitude.

The value $Z_{hyb}(f)$ is the transceiver impedance as measured at the connections to the line 2, i.e. the transceiver impedance at the interface 5 as seen from the line side.

The value $Z_{h0}(f)$ can be expressed as $Z_{h0}(f) = H_0(f) \cdot Z_{hyb}(f)$, in which the value $H_0(f)$ is the frequency dependent echo transfer function for the transceiver 1 with the connections to the line 2 shortcut and the value $Z_{hyb}(f)$ is defined above.

It is to observe that the transceiver model values are not measured directly, but are generated in a process as will be described below.

The echo transfer function $H_{echo}(f)$ of equation (1) can be expressed as:

$$H_{echo}(f) = \frac{H_\infty(f) Z_{in}(f) + Z_{h0}(f)}{Z_{in}(f) + Z_{hyb}(f)} \quad (2)$$

in which $Z_{in}(f)$ is the earlier mentioned input impedance of the line 2 as a function of the frequency $f$; and $Z_{h0}(f)$, $Z_{hyb}(f)$ and $H_\infty(f)$ are complex vectors and are the transceiver model values mentioned above.

After a calibration measurement of a certain transceiver version its vectors can be determined. These vectors, the transceiver model values, are then pre-stored in for example the software of the transceivers of the measured version, e.g. in the memory 12 of the transceiver 1. The model values are then used for the loop test of the line 2 with its initially unknown properties.

Figure 7:
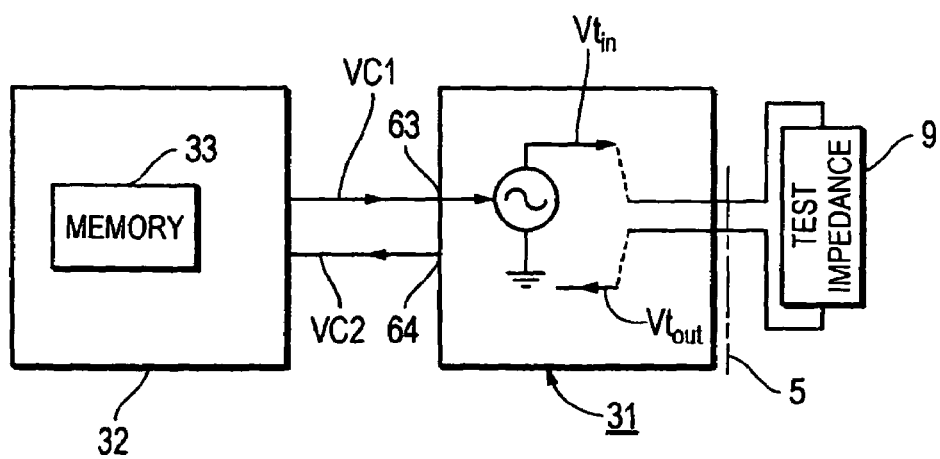
FIG. 7 shows a block schematic over the transceiver connected to an impedance of known value.

In connection with FIG. 7 will be mentioned how the calibration measurement is performed. The figure shows a test transceiver 31, to which test impedances 9 of different predetermined values are connected at the interface 5 for the line 2. A measurement device 32 with a memory 33 is connected to the input 63 and the output 64 of the test transceiver. The measurement device 32 sends a control signal VC1 to the test transceiver 31 and initiates it to generate a broadband transceiver test signal $vt_{in}$, one for each value of the test impedance 9. A reflected output transceiver test signal $vt_{out}$ is received in the test transceiver, which sends a corresponding control signal VC2 to the measurement device. A complete measurement requires the measurement of three selected impedance values. The echo transfer function $H_{echo}(f)$ is then generated in accordance with the relationship (1).

Using three impedance values for the calibration is sufficient to generate the transceiver values. To get more precise values, more than the three impedances can be used. This gives rise to an overdetermined equation system. An example on a set of standard values of the test impedance 9 for the calibration is an open circuit, a shortcut circuit and an impedance value corresponding to an expected value for the loop, e.g. 100 ohms. It should be noted that a value for a purely resistive component is normally valid only up to a limited frequency, e.g. 1 MHz. For higher frequencies it is recommended to measure the impedance value of the "resistive" component.

The generating of the three complex vectors $Z_{h0}(f)$, $Z_{hyb}(f)$ and $H_\infty(f)$ for the measured transceiver 31 is performed in the following manner. The model of the echo transfer function in the relationship (2) can be expressed as:

$$(1 - H_{echo}(f) Z_{in}(f)) \begin{pmatrix} Z_{h0}(f) \\ Z_{hyb}(f) \\ H_\infty(f) \end{pmatrix} = H_{echo}(f) Z_{in}(f) \quad (3)$$

or equivalently $Ax = b$, where $$A = (1 - H_{echo}(f) Z_{in}(f)), \quad x = \begin{pmatrix} Z_{h0}(f) \\ Z_{hyb}(f) \\ H_\infty(f) \end{pmatrix} \text{ and } b = H_{echo}(f) Z_{in}(f)$$

The general solution to the system $Ax = b$ is $$x = (A^T A)^- A^T b$$

By using the values of the transfer function $H_{echo}(f)$, measured as described above with different types of the input terminations 9, the vector x can be solved. The thus generated calibration values of the vector x are stored for example in the memory 33 of the measurement device 32 or in the memory 12 of the transceivers of the measured version. Note that A, x and b normally are complex valued and frequency dependent.

After a measurement of the echo transfer function $H_{echo}(f)$ for the actual unknown line 2, its input impedance as seen by the transceiver 1 at the interface 5 can be generated as:

$$Z_{in}(f) = \frac{Z_{h0}(f) - Z_{hyb}(f) H_{echo}(f)}{H_{echo}(f) - H_\infty(f)} \quad (4)$$

To summarize, a certain hardware for transceivers like the transceiver 1 is first calibrated. This is performed for the test transceiver 31 with the aid of the impedances 9 and the transceiver test signals $vt_{in}$ and $vt_{out}$. The vector x is calculated and the values of the vector x are stored and can be used for any transceiver with the same hardware. The echo transfer function $H_{echo}(f)$ is then measured by the transceiver 1 for the line 2 having unknown properties with the aid of the loop test signals $v_{in}$ and $v_{out}$. The frequency dependent input impedance $Z_{in}(f)$ of the line 2, as seen from the transceiver interface 5, is then generated.

In the embodiment described above, both the transceiver test signals $vt_{in}$, $vt_{out}$ and the loop test signals $v_{in}, v_{out}$ have been broadband signals. It is possible to use signals of any desired frequency width both for the calibration and the measurement of the line. The calibration and the loop test will of course be valid only for the selected frequency range. It has been mentioned that the transceiver model values are stored in the memory 12 of the transceiver 1. An obvious alternative is to store the values in the memory 33 or in a memory in some central computer and transmit them to the transceiver 1 when they are required for the generating of e.g. the input impedance $Z_{in}(f)$ of the line 2. Also, in the description has been mentioned the test transceiver 31 and the transceiver 1 for communication purposes. The test transceiver 31 can be any of a set of transceivers which are based on one and the same hardware. The test transceiver can in an obvious way be used for the communication purposes.

The above generating of transceiver model values and the generating of the impedance value for the line 2 will be shortly described in connection with flowcharts in FIGS. 8 and 9.

Figure 8:
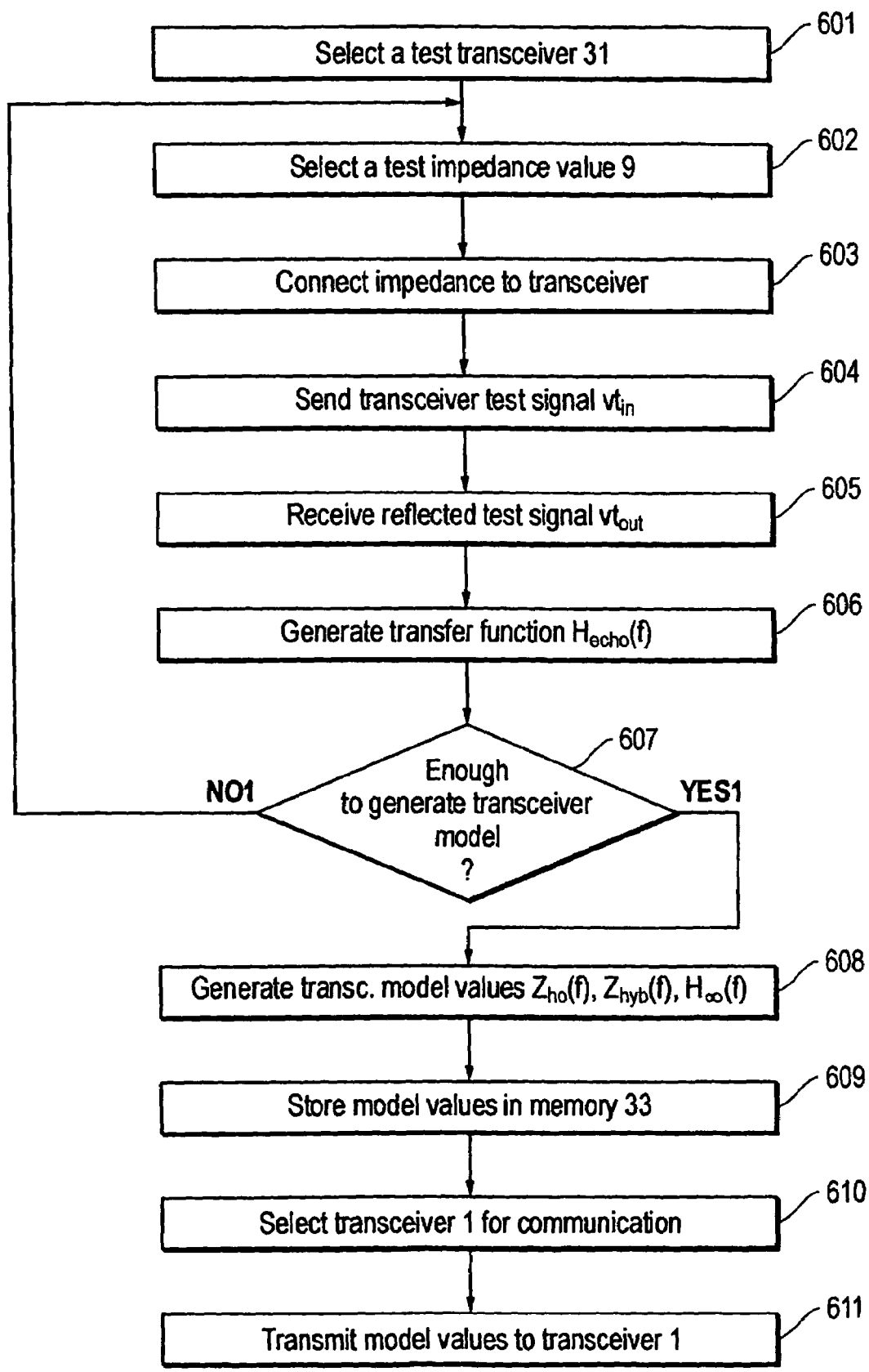
FIG. 8 shows a flow chart for generating of transceiver characteristic values.

In FIG. 8 is shown the generating and storing of the transceiver model values. The method begins in a step 601 with the selection of the transceiver 31 for test purposes. In a step 602 an impedance 9 with a predetermined value is selected and in a step 603 the impedance is connected to the line connection of the test transceiver 31. In a step 604 the transceiver test signal $vt_{in}$ is sent through the transceiver 31 to the line 2. To get transceiver model values that can be used for a wide range of applications the test signal is a broadband signal. The signal is reflected by the remote device 3 and after passage of the transceiver 31 it is received as the transceiver test signal $vt_{out}$ in a step 605. In a step 606 the echo transfer function $H_{echo}(f)$ is generated in the computational device 32 for the actual impedance 9, after first having transformed the signals $vt_{in}$ and $vt_{out}$ into the frequency domain. In a step 607 it is investigated whether measurements for a sufficient number of the impedances 9 have been made, so that the transceiver model values $Z_{h0}(f)$, $Z_{hyb}(f)$ and $H_{\infty}(f)$ can be generated. In an alternative NO1 a further impedance 9 is selected in the step 602. For an alternative YES1 the transceiver model values $Z_{h0}(f)$, $Z_{hyb}(f)$ and $H_{\infty}(f)$ are generated in a step 608. In a step 609 the vector x, i.e. the transceiver model values, are stored in the memory 33. Next, the transceiver 1 for communication purposes is selected in a step 610. In a step 611 the transceiver model values $Z_{h0}(f)$, $Z_{hyb}(f)$ and $H_{\infty}(f)$ are transmitted to the selected transceiver 1 and are stored in the memory 12.

Figure 9:
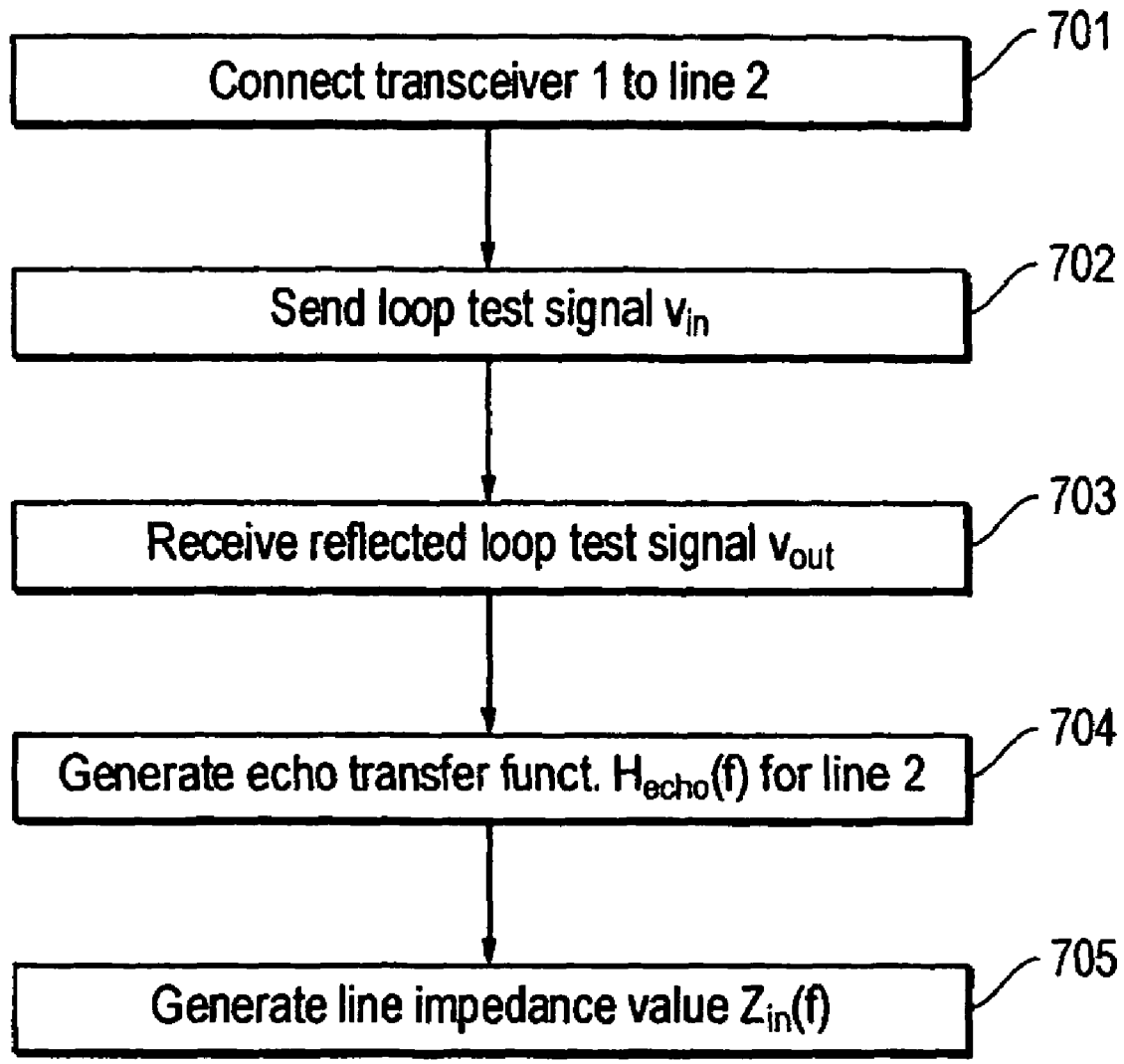
FIG. 9 shows a flow chart for generating of an impedance value for the line.

FIG. 9 shows the generating of the frequency dependent line input impedance $Z_{in}(f)$ at the transceiver interface 5 to the line 2. In a step 701 the transceiver 1 for communication purposes is connected to the line 2 with the remote device 3. The loop test signal $v_{in}$ is sent in a step 702. The loop test signal $v_{out}$ as reflected by the line 2 is received by the transceiver and is measured in a step 703. In a step 704 the frequency dependent echo transfer function $H_{echo}(f)$ is generated in the computational device 11. The frequency dependent impedance value $Z_{in}(f)$ for the line 2 is generated in the device 11 with the aid of the stored transceiver model values and the echo transfer function, step 705. This generating is performed in accordance with the relationship (4).

Appendix 1

SIMULATION OF THE ECHO TRANSFER FUNCTION FOR DAFE708

Abstract

Purpose

Application

Contents

| | | |
|---|---|---|
| 1 | Introduction | 20 |
| 2 | Simulation model for symbolic analysis | 20 |
| 2.1 | Subscriber cable | 20 |
| 2.2 | Line transformer | 21 |
| 2.3 | Out-of-Band filter | 24 |
| 2.4 | Line driver/receiver | 28 |
| 3 | Echo transfer function and Loop impedance | 34 |
| 4 | Echo impulse response | 38 |
| 5 | Annex A - Verification of simulation model | 42 |
| 6 | References | 49 |

1 INTRODUCTION

The DAFE 708 unit contains the Broadcom BladeRunner chipset (DSP and CODEC) and 10 analogue line interfaces. The line interfaces are designed around the Infineon line driver /receiver PBM 39714. For testing the single-end loop test (SELT) algorithms and investigating manufacturing test features it might be helpful to have a simulation model of the analogue front end. With this it is easy to examine the impact of changing the external load or loop connected to the line interface as well as the internal components on the PCB.

In the following such a model based on symbolic expressions is developed for the analogue part of the DAFE 708. The main purpose is to derive expressions, which can be used for evaluation of the echo transfer function $H_{echo}$.

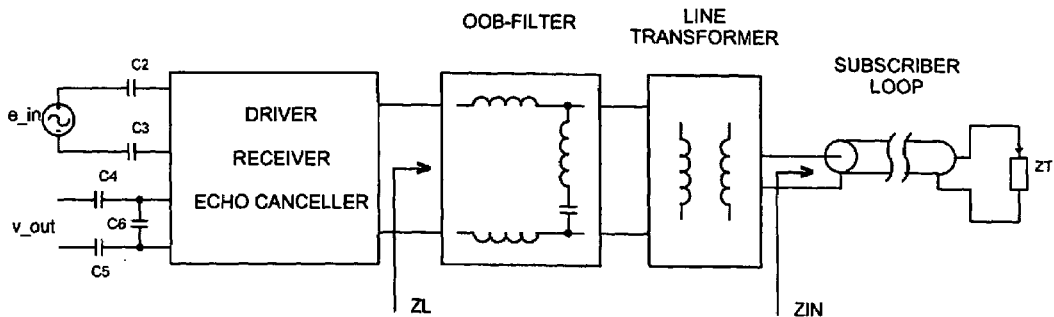

Figure 1: Block diagram of analogue part of DAFE 708

The circuit in consideration is shown in Figure 1. The analogue part is separated in three blocks – the PBM 39714 driver/receiver/echo canceller, the out-of-band noise suppression filter and the line transformer. The CODEC output is assumed to be a constant voltage source $e_{in}$. Two series capacitors are inserted between the CODEC output and the line driver. The echo transfer function is defined as $H_{echo} = V_{out}/e_{in}$ where $V_{out}$ is the received output voltage at the CODEC input. The CODEC input has a differential load impedance of 24 k$\Omega$. The shown capacitors C4, C5 and C6 are inserted to perform some low pass and high pass filtering of the receiver output.

Below each block is analysed and symbolic expressions are formulated. Finally these expressions can be combined to generate the echo transfer function. Before $H_{echo}$ can be evaluated the input impedance $Z_{IN}$ of the subscriber loop must be calculated. This requires knowledge to the primary constants of the cable, the loop length and the far-end termination.

2 SIMULATION MODEL FOR SYMBOLIC ANALYSIS

2.1 SUBSCRIBER CABLE

The input impedance of the subscriber loop is calculated by using the expressions in Annex A of Ref. [1] for the primary constants for ETSI loops. When the primary constants are found the secondary constants are given by $$Z_0 = \sqrt{\frac{R+j\omega L}{G+j\omega C}} \quad \text{and} \quad \gamma = \sqrt{(R+j\omega L)(G+j\omega C)}$$

The chain matrix of a loop with the length d is then given by $$\begin{Bmatrix} V_1 \\ I_1 \end{Bmatrix} = \begin{Bmatrix} \cosh(\gamma d) & Z_0 \sinh(\gamma d) \\ \dfrac{\sinh(\gamma d)}{Z_0} & \cosh(\gamma d) \end{Bmatrix} \begin{Bmatrix} V_2 \\ I_2 \end{Bmatrix}$$

With a given far-end termination $Z_T$ the input impedance $Z_{IN}$ can be calculated by using the expression $$Z_{IN} = \frac{Z_T \cosh(\gamma d) + Z_0 \sinh(\gamma d)}{\dfrac{Z_T}{Z_0}\sinh(\gamma d) + \cosh(\gamma d)}$$

2.2 LINE TRANSFORMER

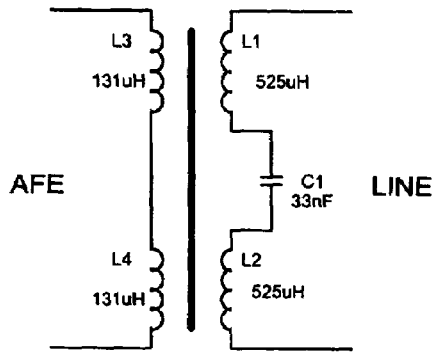

Figure 2: Line transformer for DAFE 708

The line transformer together with the series capacitor C1 is shown in Figure 2. All four windings L1, L2, L3 and L4 are placed on the same magnetic core and are closely coupled together. It is assumed that the number of turns for L1 and L2 are equal and the same for L3 and L4.

When considering only differential, balanced port signals the schematics of the transformer can be simplified in order to make the derivation of the characteristics easier.

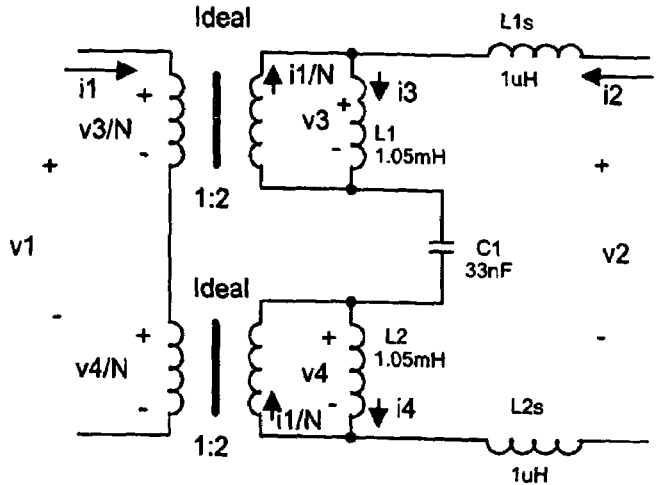

Figure 3:
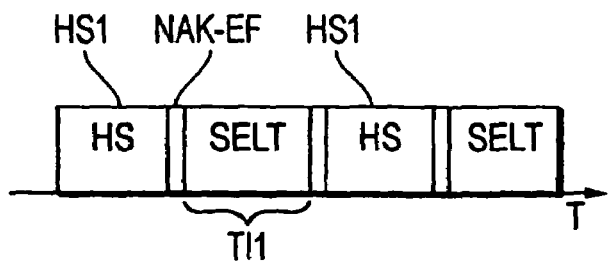
FIG. 3 shows a time diagram with periodic handshake sequences.

Figure 3: Simplified model for line transformer

The four winding symmetrical transformer is divided into two single transformers as shown in Figure 3. Each transformer is replaced by an equivalent circuit, which consists of an ideal transformer and the two inductors L1 (L2) and L1s (L2s). The ideal transformer has a turns ratio N equal to the original transformer. The ideal transformer imposes constraints on the terminal voltages and currents of the transformer as indicated in Figure 3.

The inductor L1 (L2) represents the main inductance on the line side and the inductance is actually half the open circuit inductance measured at the line side. L1s (L2s) represents the leakage inductance and is half the short circuit inductance measured at the line side (both with C1 shorted).

In order to find the chain matrix of the line transformer the port voltages and currents shown in Figure 3 are considered. The equations of the circuit are $$\frac{v_3}{N} + \frac{v_4}{N} = v_1 \qquad sL_{1s}i_2 + v_3 + \frac{i_2}{sC_1} + v_4 + sL_{2s}i_2 = v_2$$

$$v_3 = sL_1 i_3 \quad v_4 = sL_2 i_4 \quad i_3 = \frac{i_1}{N} + i_2 \quad i_4 = \frac{i_1}{N} + i_2$$

If we assume that the two single transformers are identical (L1 = L2) we have $i_4 = i_3$ and $v_4 = v_3$. This together with equation 3 to 6 can be used to eliminate $v_3$, $v_4$, $i_3$, $i_4$ from equations 1 and 2.

The second equation gives after the substitutions $$i_1 = \frac{N}{2L_1 s} v_2 - N \frac{(2L_1 + L_{1s} + L_{2s})C_1 s^2 + 1}{2L_1 C_1 s^2} i_2$$

This expression is introduced in the first equation together with the substitutions. After rearrangement the result is $$v_1 = \frac{1}{N}v_2 - \frac{2L_{1s}C_1 s^2 + 1}{NC_1 s}i_2$$

The chain matrix is defined as $$\begin{Bmatrix} v_1 \\ i_1 \end{Bmatrix} = \begin{Bmatrix} A_T & B_T \\ C_T & D_T \end{Bmatrix} \begin{Bmatrix} v_2 \\ -i_2 \end{Bmatrix}$$

Comparing with the last two expressions we have the chain parameters of the line transformer:

$$A_T = \frac{1}{N} \qquad B_T = \frac{L_l C_1 s^2 + 1}{NC_1 s}$$

$$C_T = \frac{N}{L_m s} \qquad D_T = N\frac{(L_m + L_l)C_1 s^2 + 1}{L_m C_1 s^2}$$

where we have introduced $L_m = L_1 + L_2$ and $L_l = L_{1s} + L_{2s}$ as the total main inductance and the total leakage inductance respectively measured at the line side (with $C_1$ shorted).

The actual component values for release R1.1 are:

$L_m$ = 2.1 mH,  $L_l$ = 2 μH,  $C_1$ = 33 nF,  N = 2.0.

The magnitude of the four chain parameters with these values is presented in Figure 4.

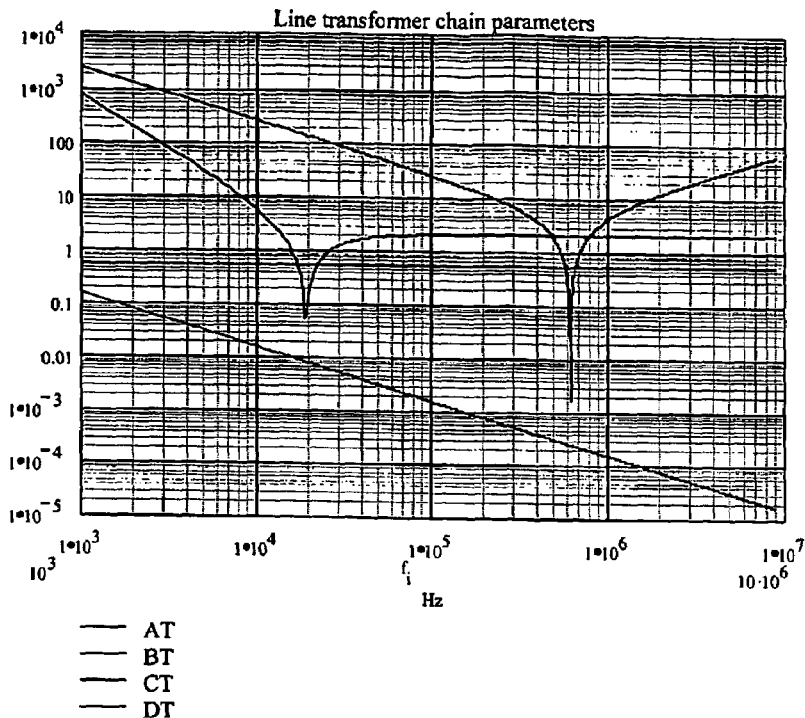

— AT
— BT
— CT
— DT

Figure 4: Chain parameters A, B, C and D of line transformer

2.3  OUT-OF-BAND FILTER

In order to suppress noise and harmonics of distortion above the ADSL band it has been necessary to introduce an Out-of-Band filter between the line driver and the line transformer. The OOB-filter has the following configuration shown in Figure 5.

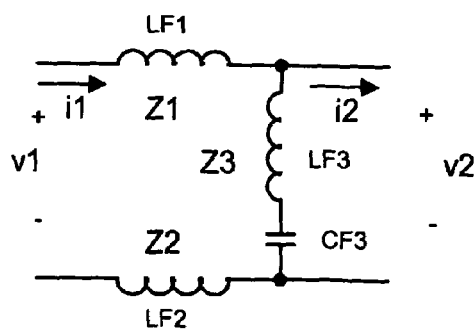

Figure 5: Filter for out-of-band noise

The impedance of the series branches is $Z_1 = Z_2 = sL_{F1}$ assuming that $L_{F1} = L_{F2}$. The impedance of the shunt branch is $$Z_3 = sL_{F3} + \frac{1}{sC_{F3}} = \frac{L_{F3}C_{F3}s^2 + 1}{sC_{F3}}$$

With $i_2 = 0$ and a voltage $v_1$ applied we have $$v_2 = \frac{Z_3}{Z_3 + 2Z_1} v_1 \quad \text{or} \quad v_1 = \frac{Z_3 + 2Z_1}{Z_3} v_2$$

If the expressions for the impedances are substituted into the equation the result is $$v_1 = \frac{(L_{F3} + 2L_{F1})C_{F3}s^2 + 1}{L_{F3}C_{F3}s^2 + 1} v_2$$

With $i_2 = 0$ and a current $i_1$ applied we have $v_2 = Z_3 i_1$ or $i_1 = v_2/Z_3$ $$i_1 = \frac{C_{F3}s}{L_{F3}C_{F3}s^2 + 1} v_2$$

With $v_2 = 0$ and a voltage $v_1$ applied we have $i_2 = v_1/2L_{F1}s$ or $$v_1 = 2L_{F1}s \cdot i_2$$

With $v_2 = 0$ and a current $i_1$ applied we have $i_2 = i_1$ or $i_1 = i_2$.

The chain matrix is defined as $$\begin{Bmatrix} v_1 \\ i_1 \end{Bmatrix} = \begin{Bmatrix} A_F & B_F \\ C_F & D_F \end{Bmatrix} \begin{Bmatrix} v_2 \\ i_2 \end{Bmatrix}$$

Comparing the expressions derived above we have the chain parameters of the OOB-filter:

$$A_F = \frac{(L_{F3} + 2L_{F1})C_{F3}s^2 + 1}{L_{F3}C_{F3}s^2 + 1} \qquad B_F = 2L_{F1}s$$

$$C_F = \frac{C_{F3}s}{L_{F3}C_{F3}s^2 + 1} \qquad D_F = 1$$

The actual component values for release R1.1 are:

$L_{F1} = L_{F2} = 680$ μH, $L_{F3} = 270$ μH, $C_{F3} = 4.7$ nF.

The magnitude of the four chain parameters with these values is presented in Figure 6.

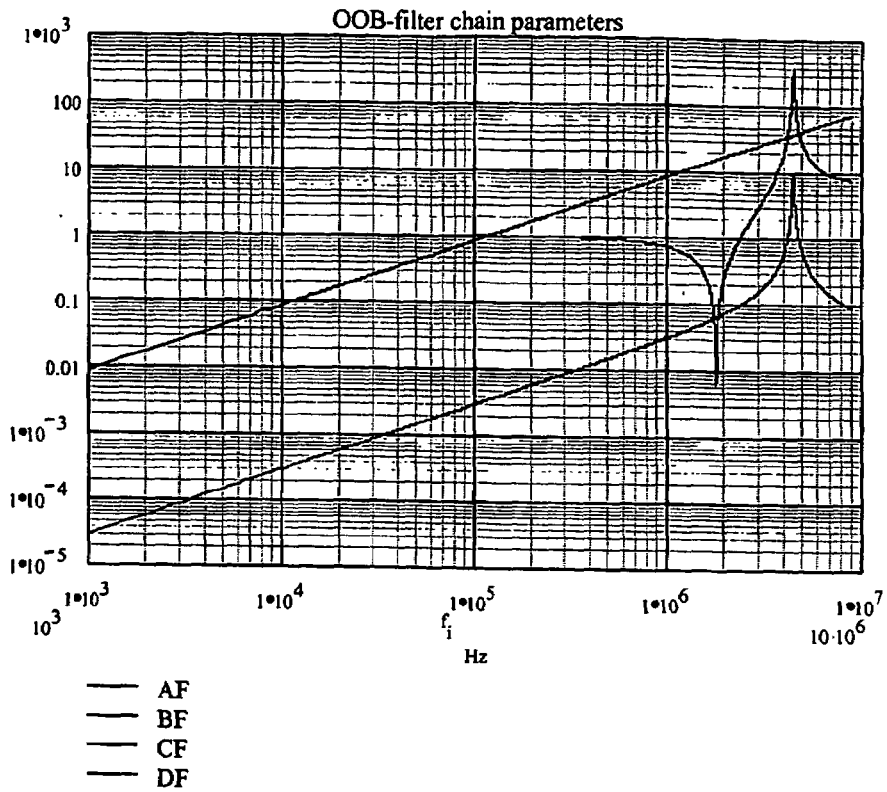

Figure 6: Chain parameters A, B, C and D of OOB-filter

If the input impedance of the subscriber loop $Z_{IN}$ is known the driver load impedance $Z_L$ of the AFE shown in Figure 1 can be found from $$Z_L = \frac{A_L Z_{IN} + B_L}{C_L Z_{IN} + D_L}$$

The four coefficients are obtained by multiplication of the chain matrix of the OOB-filter with the chain matrix of the line transformer $$\begin{Bmatrix} A_L & B_L \\ C_L & D_L \end{Bmatrix} = \begin{Bmatrix} A_F & B_F \\ C_F & D_F \end{Bmatrix} \begin{Bmatrix} A_T & B_T \\ C_T & D_T \end{Bmatrix}$$

If the subscriber loop is replaced by a resistor of 100 Ω the load impedance $Z_L$ turns out as illustrated in Figure 7.

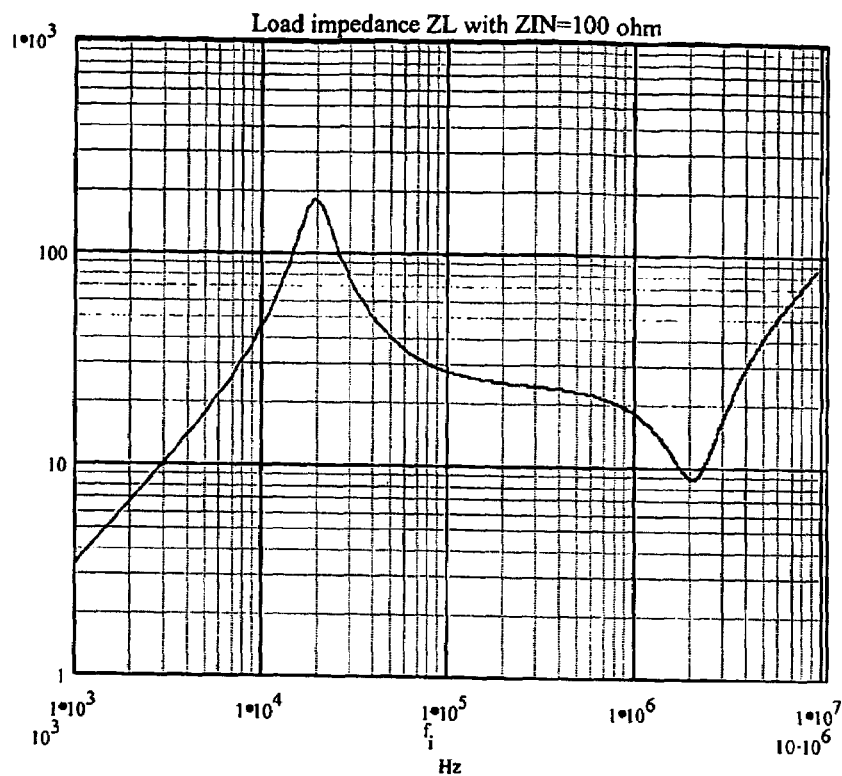

Figure 7: Driver load impedance ZL with the line interface terminated into 100 Ω

In the ideal case $Z_L$ should be given by $100\ \Omega/N^2 = 25\ \Omega$, which is seen only to be the case between 100 kHz and 1 MHz approximately. The peaking at low frequencies is caused by the line transformer and the series capacitor at the line side. The series resonance circuit of the OOB-filter is responsible for the minimum at 2 MHz.

2.4 LINE DRIVER/RECEIVER

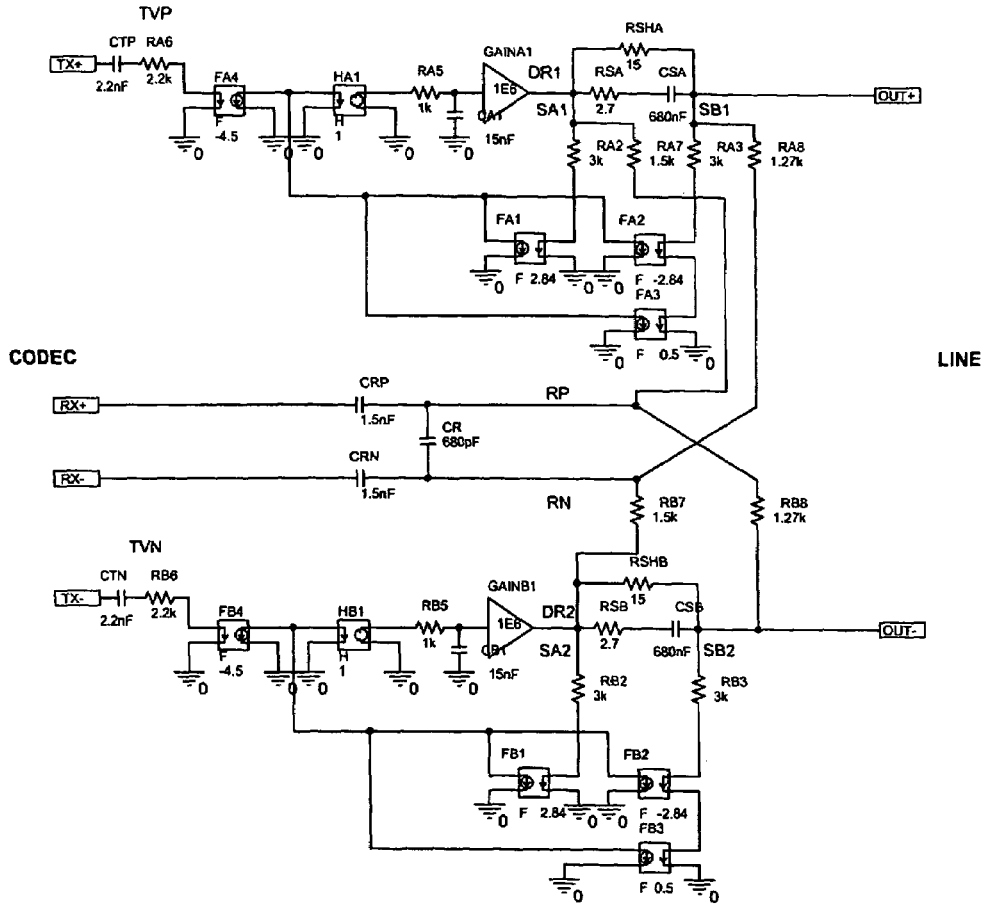

Figure 8: Schematics of the AFE with the PBM 39714 line driver/receiver

The Analogue Front-End (AFE) consists apart from the line transformer and OOB-filter of the PBM 39714 line driver/receiver and a few external components. PBM 39714 is a differential mode line driver and receiver including an echo canceller bridge. A suitable model of the device is shown in Figure 8. The input terminals are TVP and TVN with the input resistors RA6 and RB6. The amplified transmit signal appears between the driver output terminals DR1 and DR2. A sense impedance network $Z_S$ consisting of RSA, CSA and RSHA (RSB, CSB and RSHB) is placed in series with the driver output. The voltages at the terminals of the sense impedance network are converted into currents through the two 3 kΩ resistors at the terminals SA1 and SB1 (SA2 and SB2). The currents are subtracted by the two current controlled current sources FA1 and FA2 (FB1 and FB2). The difference current represents the voltage across the sense impedance network or the driver output current multiplied by $Z_S$. This current is fed back to control the driver output voltage. The result is that the driver output impedance is equal to $Z_S$ multiplied by a real scale factor K. A second feedback path through the controlled source FA3 (FB3) is used to set the transmit gain of the driver output stage.

The echo canceller consists of the resistor bridge RA7, RA8, RB7 and RB8. If the load impedance $Z_L$ is matched to the sense impedance $K*Z_S$ the echo signal between output terminals RP and RN will ideally be zero with the selected resistor ratio of the bridge.

The receive path is purely passive. The received signal across the line transformer is sensed through the bridge resistors RA8 and RB8 where it appears between the terminals RP and RN. The echo canceller however also affects the received signal. The parallel capacitor CR and the two series capacitors CRP and CRN constitute an output filter together with the receiver output impedance and the CODEC input impedance.

In order to derive a symbolic expression for the echo transfer function the simplified, unbalanced model of the line driver/receiver in Figure 9 is used. A detailed analysis of the circuit is presented in Ref. [2].

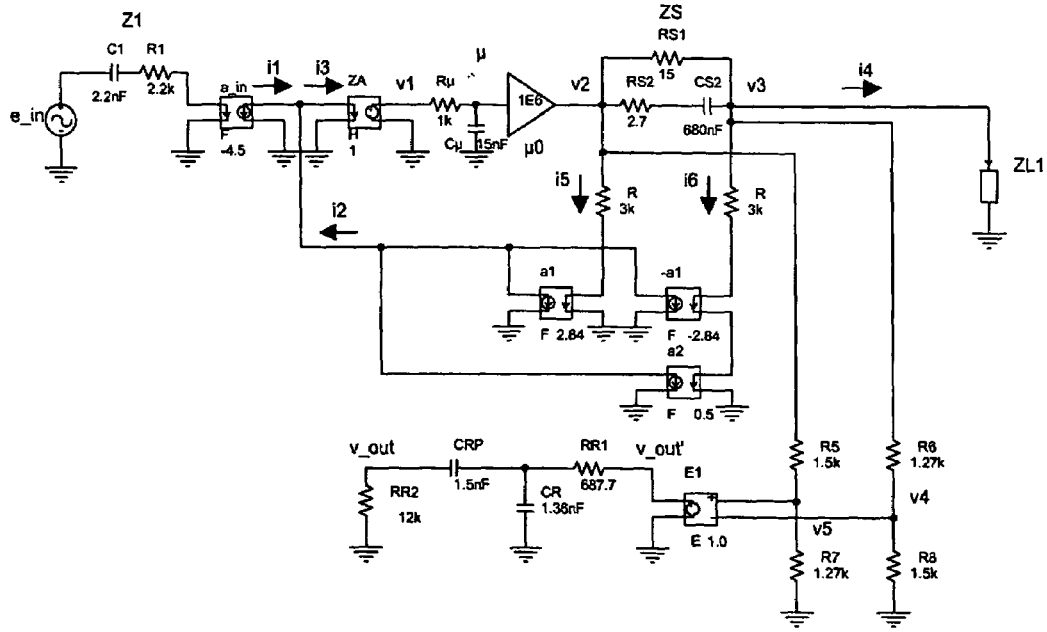

Figure 9: Simplified, unbalanced model for deriving the echo transfer function of the line driver/receiver

The echo transfer function $H_{echo}(f)$ is given by $H_{echo} = v_{out}/e_{in}$. This can also be written as $$H_{echo} = \frac{v_{out}}{e_{in}} = \frac{v_{out}}{v'_{out}} \cdot \frac{v'_{out}}{e_{in}}$$

where $v_{out}/v'_{out}$ is the transfer function of the output filter.

The following equations apply to the circuit in Figure 9 (see also section 2.3 of Ref. [2])

$$v'_{out} = v_5 - v_4 = \frac{R_7}{R_7 + R_5}v_2 - \frac{R_8}{R_8 + R_6}v_3$$

$$i_5 = \frac{v_2}{R} \quad i_6 = \frac{v_3}{R} \quad v_1 = Z_A i_3 \quad v_2 = \mu v_1 \quad v_3 = Z_{L1} i_4 \quad v_2 - v_3 = Z_S i_4$$

$$i_3 = i_1 + i_2 = \frac{a_{in}}{Z_1} e_{in} - a_1 i_5 + a_1 i_6 - a_2 i_6$$

By substitution it is possible to derive $$v_2 = \left(1 + \frac{Z_S}{Z_{L1}}\right) v_3 \qquad \text{and}$$

$$v_2 = \mu H \left(\frac{a_{in}}{Z_1} e_{in} - \frac{a_1}{R} v_2 + \frac{a_1}{R} v_3 - \frac{a_2}{R} v_3\right)$$

It is now possible to eliminate $v_2$ and to find $v_3$ expressed by the equation $$v_3 + \frac{Z_S}{Z_{L1}} v_3 + \mu Z_A \frac{a_2}{R} v_3 + \mu Z_A \frac{a_1}{R} \frac{Z_S}{Z_{L1}} v_3 = \mu Z_A \frac{a_{in}}{Z_{L1}} e_{in} \qquad \text{or}$$

$$v_3 = \frac{R Z_{L1} \mu Z_A a_{in}}{Z_1(R(Z_{L1} + Z_S) + \mu Z_A (a_2 Z_{L1} + a_1 Z_S))} e_{in}$$

Using the first relation between $v_2$ and $v_3$ it is possible to express $v_2$ as $$v_2 = \frac{R(Z_{L1} + Z_S) \mu Z_A a_{in}}{Z_1(R(Z_{L1} + Z_S) + \mu Z_A (a_2 Z_{L1} + a_1 Z_S))} e_{in}$$

The last two expressions are now substituted into the equation for $v'_{out}$ to give $$v'_{out} = \frac{R \mu Z_A a_{in}}{Z_1(R(Z_{L1} + Z_S) + \mu Z_A (a_2 Z_{L1} + a_1 Z_S))} \left[\frac{R_7}{R_7 + R_5}(Z_{L1} + Z_S) - \frac{R_8}{R_8 + R_6} Z_{L1}\right]$$

If we assume that $R_5 = R_8$ and $R_7 = R_6$ it can be rearranged to $$\frac{v'_{out}}{e_{in}} = \frac{\mu Z_A R a_{in}}{Z_1(R_6 + R_8)} \frac{(R_6 - R_8) Z_{L1} + R_6 Z_S}{(R + \mu Z_A a_2) Z_{L1} + (R + \mu Z_A a_1) Z_S}$$

It is seen that $v'_{out} = 0$ if $R_8/R_6 = 1 + Z_S/Z_{L1}$ (echo cancellation).

The transfer function $v'_{out}/e_{in}$ can also be expressed as $$\frac{v'_{out}}{e_{in}} = G_1 \frac{A_1 Z_{L1} + A_0}{B_1 Z_{L1} + B_0}$$

The coefficients may now be identified by comparing the last two expressions. Then we have $$G_1 = \frac{\mu Z_A Ra_{in}}{Z_1(R_6 + R_8)} \qquad A_1 = R_6 - R_8 \qquad A_0 = R_6 Z_S$$

$$B_1 = R + \mu Z_A a_2 \qquad B_0 = (R + \mu Z_A a_1) Z_S$$

To find the echo transfer function we need to derive the transfer function for the output filter $H_{out} = v_{out}/v'_{out}$. By considering the filter circuit in Figure 9 it is possible to calculate the transfer function to $$H_{out} = \frac{R_{R2} C_{RP} s}{R_{R1} R_{R2} C_{RP} C_R s^2 + (R_{R1} C_{RP} + R_{R1} C_R + R_{R2} C_{RP}) s + 1}$$

If we write the echo transfer function $H_{echo}$ as $$H_{echo} = \frac{v_{out}}{e_{in}} = G \frac{A_1 Z_{L1} + A_0}{B_1 Z_{L1} + B_0}$$

we see that the multiplier is $G = G_1 * H_{out}$ while the other coefficients remain unaltered.

For calculations with the expression for $H_{echo}$ we need the frequency dependent quantities $Z_1$, $Z_S$ and $\mu$.

$Z_1$ is given by $$Z_1 = R_1 + \frac{1}{sC_1} = \frac{sR_1 C_1 + 1}{sC_1}$$

The sense impedance $Z_S$ is given by $$Z_S = \frac{1}{\frac{1}{R_{S1}} + \frac{sC_{S2}}{sR_{S2}C_{S2} + 1}} = \frac{R_{S1}(sR_{S2}C_{S2} + 1)}{s(R_{S1} + R_{S2})C_{S2} + 1}$$

The open loop gain $\mu$ is determined by the DC gain $\mu_0$ and the corner frequency given by the resistor $R_\mu$ and the capacitor $C_\mu$ $$\mu = \frac{\mu_0}{sR_\mu C_\mu + 1}$$

With these modifications taken in consideration the coefficients of $H_{echo}$ now finally can be identified as follows:

$$G = \frac{\mu Z_A R a_{in}}{Z_1(R_6 + R_8)} H_{out}$$

$$A_1 = R_6 - R_8 \qquad A_0 = R_6 Z_S$$

$$B_1 = R + \mu Z_A a_2 \qquad B_0 = (R + \mu Z_A a_1) Z_S$$

where $Z_1 = \dfrac{sR_1C_1 + 1}{sC_1}$ $\qquad Z_S = \dfrac{R_{S1}(sR_{S2}C_{S2} + 1)}{s(R_{S1} + R_{S2})C_{S2} + 1}$ $$\mu = \frac{\mu_0}{sR_\mu C_\mu + 1} \qquad \text{and}$$

$$H_{out} = \frac{R_{R2} C_{RP} s}{R_{R1} R_{R2} C_{RP} C_R s^2 + (R_{R1} C_{RP} + R_{R1} C_R + R_{R2} C_{RP}) s + 1}$$

The actual component values in release R1.1 are:

$R_1$ = 2.2 kΩ, $C_1$ = 2.2 nF, $a_{in}$ = -4.0, $Z_A$ = 1, $R_\mu$ = 1 kΩ, $C_\mu$ = 15 nF, $\mu_0 = 10^{+6}$ $a_1$ = 2.84, $a_2$ = 0.5, R = 3 kΩ

$R_{S1}$ = 15 Ω, $R_{S2}$ = 2.7 Ω, $C_{S2}$ = 680 nF, $R_6$ = 1.27 kΩ, $R_8$ = 1.5 kΩ, $R_{R1} = R_6 // R_8$ = 687.7 Ω, $R_{R2}$ = 12 kΩ, $C_R$ = 2*680 pF = 1.36 nF, $C_{RP}$ = 1.5 nF.

If the load impedance $Z_{L1}$ is known the echo transfer function can be calculated from $$H_{echo} = G \frac{A_1 Z_{L1} + A_0}{B_1 Z_{L1} + B_0}$$

Note that $Z_{L1}$ in this expression shall only be half the impedance $Z_L$ calculated in section 2.3! This is because the expression for $H_{echo}$ is based on the unbalanced version of the AFE circuit.

For the case where the subscriber loop is replaced by a resistor of 100 Ω the corresponding echo transfer function is shown in below.

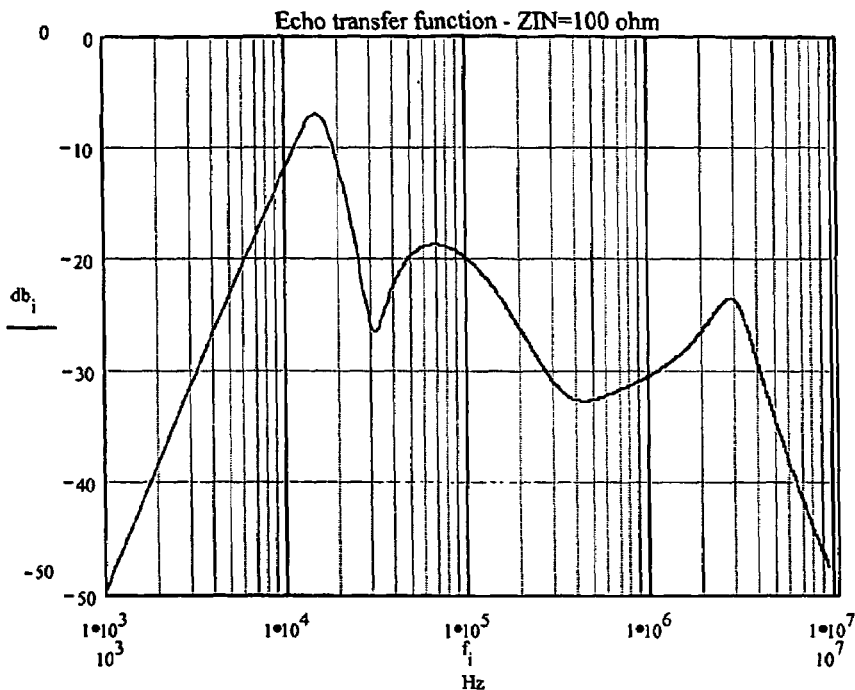

Figure 10: Echo transfer function with the line interface terminated into 100 Ω

The procedure for calculating the echo transfer function can now be stated as follows:

1. Find the primary cable parameters for the selected type of cable (R,L,G,C), the cable length (d) and the far-end termination impedance ($Z_T$). Calculate the input impedance of the loop $Z_{IN}$.

2. Calculate the driver load impedance $Z_L$ by using the combined chain matrix for the line transformer and OOB-filter sections and the loop impedance $Z_{IN}$.

3. With the load impedance $Z_{L1} = Z_L/2$ the echo transfer function can now be calculated by using the expression for $H_{echo}$ for the line driver/receiver PBM 39714.

3 ECHO TRANSFER FUNCTION AND LOOP IMPEDANCE

The echo transfer function was found in the preceding section 2.4 as $$H_{echo} = G \frac{A_1 \frac{Z_L}{2} + A_0}{B_1 \frac{Z_L}{2} + B_0}$$

and the load impedance $Z_L$ is related to the input impedance $Z_{IN}$ of the subscriber loop as shown in section 2.3

$$Z_L = \frac{A_L Z_{IN} + B_L}{C_L Z_{IN} + D_L}$$

If this is substituted into the expression for $H_{echo}$ we have after some rearrangements $$H_{echo} = G \frac{\left(\frac{A_1}{2} A_L + A_0 C_L\right) Z_{IN} + \left(\frac{A_1}{2} B_L + A_0 D_L\right)}{\left(\frac{B_1}{2} A_L + B_0 C_L\right) Z_{IN} + \left(\frac{B_1}{2} B_L + B_0 D_L\right)}$$

If we write $H_{echo}$ as $$H_{echo} = \frac{Y_1 Z_{IN} + M_1}{Y_2 Z_{IN} + M_2}$$

we have the identification $$Y_1 = G\left(\frac{A_1}{2} A_L + A_0 C_L\right) \qquad M_1 = G\left(\frac{A_1}{2} B_L + A_0 D_L\right)$$

$$Y_2 = \frac{B_1}{2} A_L + B_0 C_L \qquad M_2 = \frac{B_1}{2} B_L + B_0 D_L$$

If $Z_{IN} \to \infty \Rightarrow H_{echo} \to H_\infty = Y_1/Y_2$, which is the echo transfer function if the subscriber loop is replaced by an open circuit.

If $Z_{IN} = 0 \Rightarrow H_{echo} = H_0 = M_1/M_2$, which is the echo transfer function if the subscriber loop is replaced by a short circuit.

By division with $Y_2$, $H_{echo}$ can also be written as $$H_{echo} = \frac{\frac{Y_1}{Y_2} Z_{IN} + \frac{M_1}{Y_2}}{Z_{IN} + \frac{M_2}{Y_2}} = \frac{H_\infty Z_{IN} + Z_{h0}}{Z_{IN} + Z_{hyb}}$$

where $Z_{hyb} = M_2/Y_2$ and $Z_{h0} = M_1/Y_2$.
Using the actual components values the four highlighted functions can be calculated. The results are shown below.
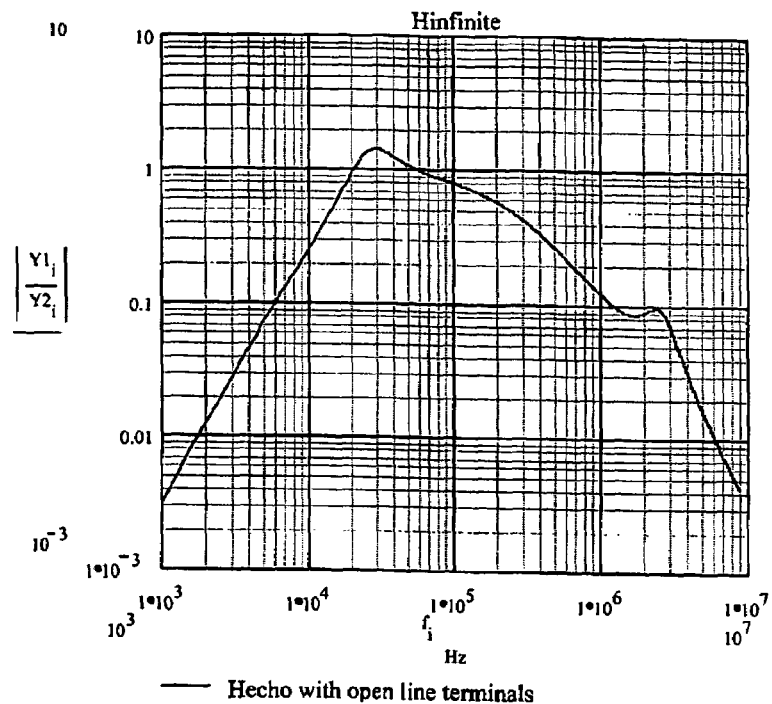
— Hecho with open line terminals
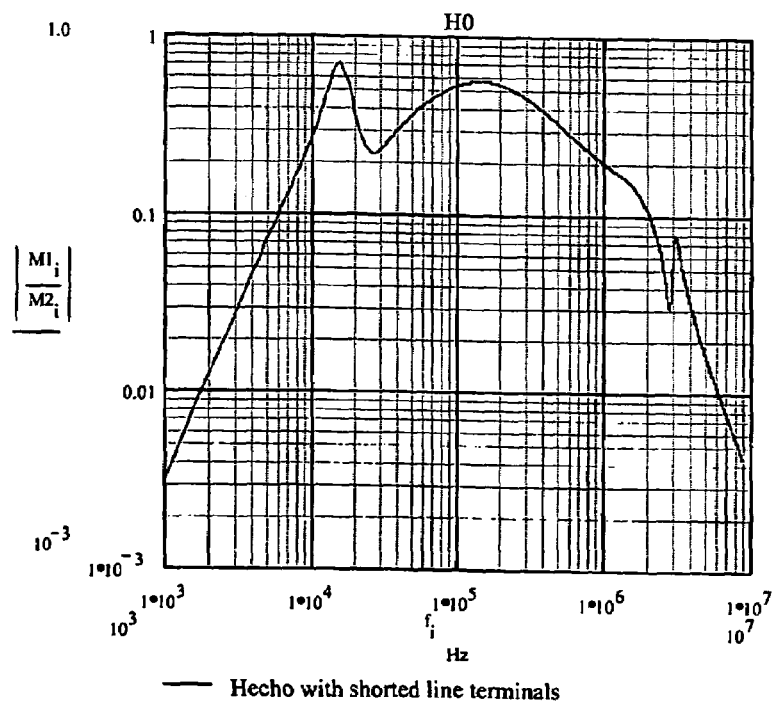
— Hecho with shorted line terminals

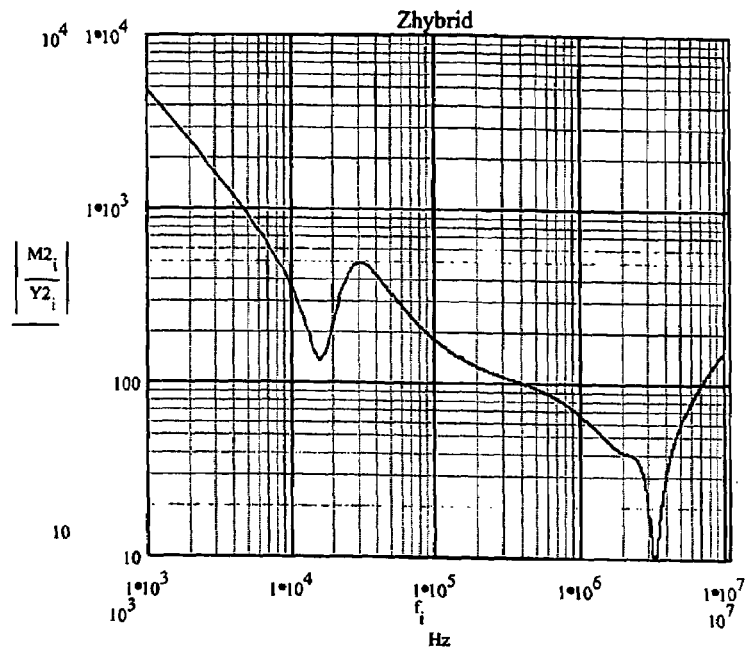
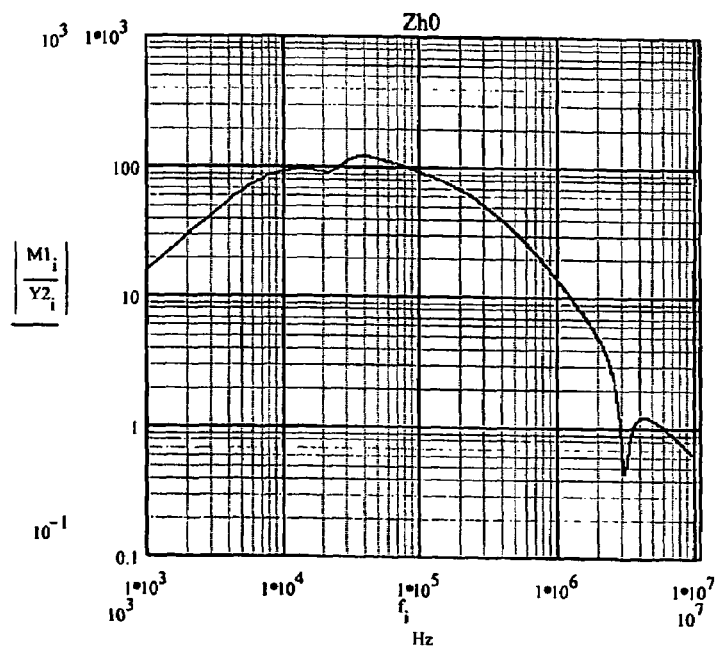
The last expression for Hecho may also be written as
$$H_{echo}Z_{IN} + H_{echo}Z_{hyb} - H_{\infty}Z_{IN} - Z_{h0} = 0$$
If the echo transfer function $H_{echo}$ is measured with a set of appropriate terminations $Z_{IN}$ it is possible to solve for the unknown coefficients $Z_{hyb}$, $Z_{h0}$ and $H_{\infty}$ considering the expression as a set of equations. This is described in details in Ref. [3]. The coefficient $H_\infty$ may be determined directly from one single measurement with $Z_{IN} \to \infty$. With two different resistive terminations it should be possible to find the remaining coefficients $Z_{hyb}$ and $Z_{h0}$. These parameters completely characterize the analogue front-end inclusive the line transformer since $H_{echo}$ always must be a bilinear function in $Z_{IN}$.

With the actual subscriber loop connected to the ADSL modem it is now possible to derive the input impedance of the loop $Z_{IN}$. This is done by inverting the expression for $H_{echo}$ $$Z_{IN} = \frac{Z_{h0} - H_{echo} Z_{hyb}}{H_{echo} - H_\infty}$$

This approach is further described in Ref. [3].

The procedure can be described as follows:

1. Measure the echo transfer function with open line terminals and save the result as $H\infty$.

2. Measure the echo transfer function with at least two resistive terminations (more measurements may improve the accuracy).

3. Solve for the parameters $Z_{hyb}$ and $Z_{h0}$ and save the results. This concludes the calibration procedure.

4. Measure the echo response with the actual loop connected to the ADSL modem and calculate the input impedance $Z_{IN}$.

5. The input impedance $Z_{IN}$ may next be used to identify the subscriber loop.

4 ECHO IMPULSE RESPONSE

The measured echo transfer function can be used for deriving the corresponding echo impulse response. Usually the echo transfer function is only measured at a finite number of discrete frequencies. If $H_{echo}$ is assumed to be band-limited above the Nyquist frequency it may be considered as a period of the echo transfer function of a time-discrete system. $H_{echo}$ is sampled at $2^N$ frequency points to give $H_{echo}(kF)$ where F is the distance between the samples. If $H_{echo}(kF)$ is expanded around $f = 0$ with complex conjugate symmetry an IFFT performed on it will generate the corresponding time-discrete echo impulse response $h_{echo}(kT)$.

For a typical subscriber loop $h_{echo}$ has a pulse-like waveform with a large peak at the time t close to zero. This pulse is followed by a damped oscillation mainly caused by the line transformer section. Somewhere on this curve another small pulse-like waveform is visible. This represents the reflection of the initial pulse waveform from the far end of the loop.

By measuring the distance in time between the occurrence of the first pulse and the second one the delay time forth and back in the actual subscriber loop can be found. If the velocity of propagation of the cable is known the physical cable length d can be calculated.

The ratio between the energy in the first and second pulse could be used to estimate the cable loss since the ratio should be $\exp(-2\alpha d)$ approximately. This part is most conveniently accomplished with a band pass filtered version of the echo response in order to evaluate the cable loss at a certain frequency. See Ref. [4] for further details.

The presence of the analogue echo canceller in the AFE however tends to make this approach questionable as described below.

What is needed in the determination of the cable length and cable loss is the incident and reflected pulse waveform in time at the input at subscriber loop. The available information is however the echo impulse response measured at the receiver output terminals. It is therefore necessary to "transform" the measured impulse response from the receiver output to the line terminals or what is the same to the line transformer input. This is illustrated in Figure 11 and Figure 12 below.

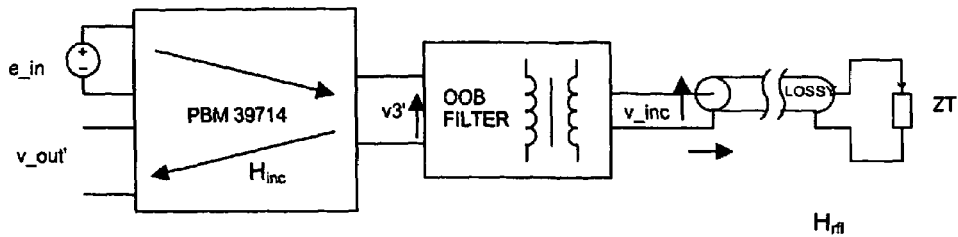

Figure 11: Echo path of the incident wave

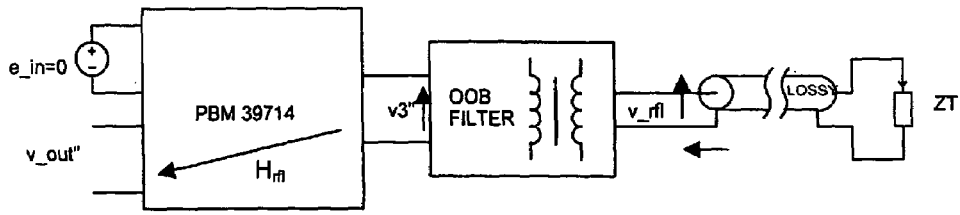

Figure 12: Receive path of the reflected wave

From Ref. [2], 2.3 or the equations in section 2.4 we have the transfer function from the AFE output voltage $v_3'$ to the CODEC input voltage $v_{out}'$ with $e_{line} = 0$ and $e_{in} \neq 0$ $$v'_{out} = V_5 - V_4 = \frac{R_6}{R_6 + R_8}\left(1 + \frac{Z_S}{Z_{L1}}\right)v'_3 - \frac{R_8}{R_8 + R_6}v'_3$$

which can be rearranged to $$H_{inc} = \frac{v'_{out}}{v'_3} = \frac{R_6 Z_S + (R_6 - R_8)Z_{L1}}{(R_8 + R_8)Z_{L1}}$$

The CODEC input voltage $v_{out}''$ with $e_{line} \neq 0$ and $e_{in} = 0$ can be written as (see also Ref. [2], section 2.4)

$$v''_{out} = V_5 - V_4 = \frac{R_6}{R_6 + R_8}v_2 - \frac{R_8}{R_8 + R_6}v_3$$

With $e_{in} = 0$ we have $$V_2 = \mu Z_A \left(-\frac{a_1}{R}V_2 + \frac{a_1}{R}V_3 - \frac{a_2}{R}V_3\right)$$

Using this $V_2$ can be eliminated and the transfer function now becomes $$H_{rfl} = \frac{V''_{out}}{V''_3} = \frac{(a_1 - a_2)\mu Z_A R_6 - (a_1 \mu Z_A + R)R_8}{(R_6 + R_8)(a_1 \mu Z_A + R)} \cong \frac{(a_1 - a_2)R_6 - a_1 R_8}{a_1(R_6 + R_8)}$$

Both functions $H_{inc}$ and $H_{rfl}$ shall be multiplied with the output filter transfer function $H_{out}$. Since we only are interested in the ratio between the functions this can be omitted.

It can be noted that while $H_{rfl}$ is independent of the load impedance $Z_{L1}$ the transfer function of the incident signal $H_{inc}$ is dependent on $Z_{L1}$ or the impedance of the subscriber loop. Both functions are frequency dependent.

If we consider the envelopes of the band pass filtered pulses, which occur in $h_{echo}(t)$ the assumption is that the envelopes at the line transformer can be found as Incident waveform: $\quad Env(v_{3,inc}) = \dfrac{Env(v_{out,inc})}{|H_{inc}|^2}$ Reflected waveform: $\quad Env(v_{3,rfl}) = \dfrac{Env(v_{out,rfl})}{|H_{rfl}|^2}$ The estimated cable loss is calculated as $$A = \tfrac{1}{2}10\log_{10}\left(\frac{Env(v_{3,inc})}{Env(v_{3,rfl})}\right) = \tfrac{1}{2}10\log_{10}\left(\frac{Env(v_{out,inc})}{Env(v_{out,rfl})}\right) + 10\log_{10}\left|\frac{H_{rfl}}{H_{inc}}\right| \quad dB$$

The last term is the logarithm to the scale factor $|H_{rfl}/H_{inc}|$. Using the actual component values the scale factor can be calculated for the cases where the subscriber loop is a 0.4 mm and a 0.5 mm PE cable. The result is shown below. The graphs show that the scale factor is frequency dependent, but also dependent on the characteristic impedance of the subscriber loop. It is therefore not possible to find one single scale factor covering all cases.

The analysis demonstrates that the echo canceller decreases the energy of the incident wave relatively to the reflected wave – this is actually the idea with an echo canceller. The advantage is that the dynamic range for retrieving weak echoes is improved when the near-end echo is suppressed. The disadvantage is that the energy of the incident wave cannot be found directly from the measured echo response.

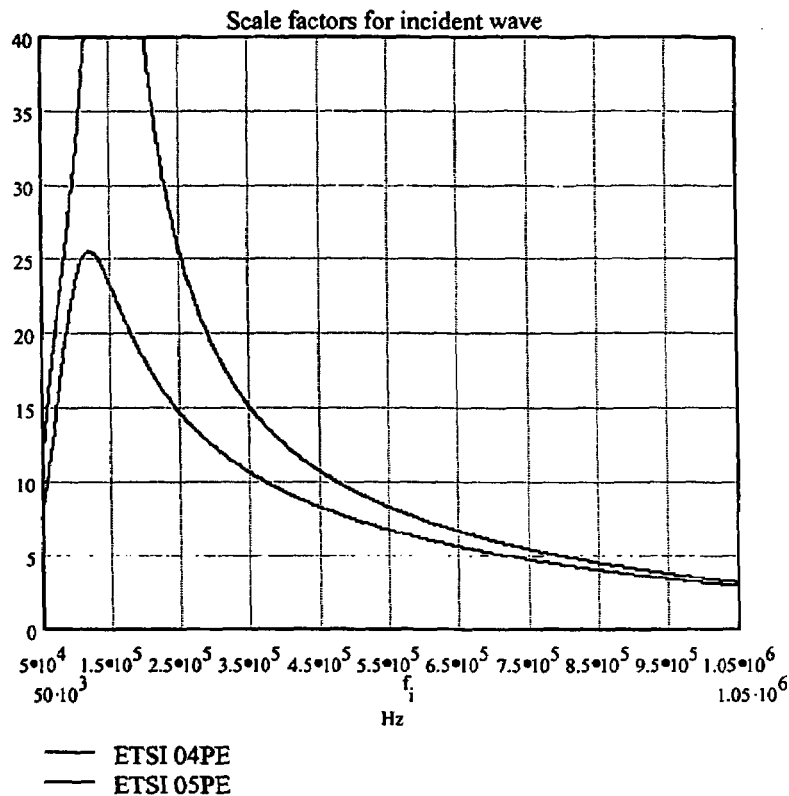

Figure 13: Scale factors for incident envelope

Ref. [4] demonstrates how the estimate of the cable loss becomes erroneous if the correction term from the scale factor is not taken into consideration.

Again to illustrate the importance of the scaling factor the simulation model is used to estimate the cable loss at 300 kHz for a 0.4 mm PE cable at different lengths. The procedure described in Ref. [4] is applied here. In Figure 14 the envelope loss is the loss based on the ratio between the envelopes of the incident and reflected wave. From Figure 13 the scale factor at 300 kHz for the 0.4 mm PE cable is approximately 12.5 or 10.9 dB. If the scale factor term of this magnitude is added to the envelope loss the cable loss appears. Finally the nominal cable loss of the cable is shown for comparison also in Figure 14.

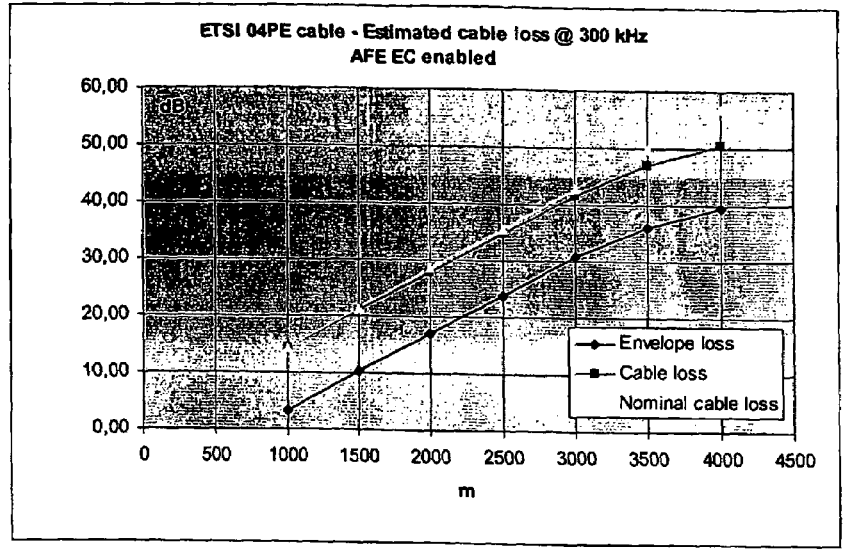

Figure 14: Estimated cable loss at 300 kHz for a 04PE loop (Echo canceller enabled)

It is possible in the simulation model to disable the echo canceller. If this is done the following results occur for the estimated cable loss. This clearly illustrates the effect of the echo canceller on the envelopes.

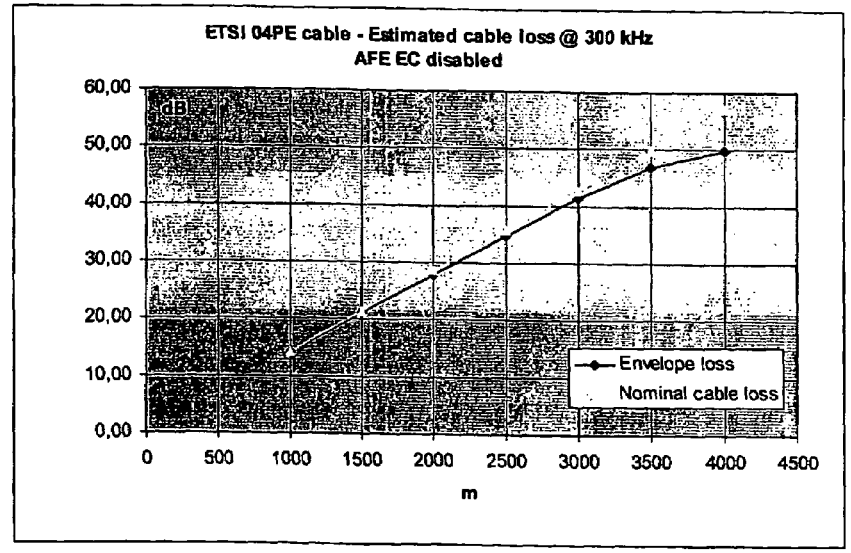

Figure 15: Estimated cable loss at 300 kHz for a 04PE loop (Echo canceller disabled)

ANNEX A - VERIFICATION OF SIMULATION MODEL

In order to verify the simulation model measurements on a DAFE 708 unit has been carried out. The series capacitors between the CODEC and the line driver/receiver are disconnected at the CODEC side. The transmit signal $e_{in}$ is applied to the capacitors through a 50/100 Ω balancing transformer. The series capacitors at the receive side are terminated to ground via two 12 kΩ resistors to simulate the input impedance of the CODEC. The output voltage $V_{out}$ is measured with a high-impedance differential probe amplifier. A cable simulator is connected to the line interface to simulate different loops.

The following equipment have been used during the measurements:

| | | |
|---|---|---|
| EDA R1.1 IP DSLAM | BFB40102/A1 P1B, 008037AC4EE9 DAFE 708 – ROA 119 708 | with |
| Network Analyzer 4395A | Agilent | FAA21372 |
| S-parameter accessory kit | Agilent | FAA21741 |
| Differential Probe Amplifier | Hewlett-Packard | FAA |
| Cable Simulator DLS400E | Spirent | FAA |

The echo transfer function is measured with the network analyzer. The input impedance of the simulated loop is measured with the S-parameter accessory kit attached to the network analyzer.

First the input impedance $Z_{IN}$ of the cable simulator is compared with the same impedance calculated from the transmission line formulae. The result for a 0.5 mm PE cable (ETSI loop #2) with a length of 500 m open ended is shown in Figure 16 below. There seems to be a reasonable agreement between the measured and calculated results almost up 1 MHz (phase angle only up to 500 kHz). Similar results are observed for other loop lengths.

In Figure 17, which follows, the driver load impedance $Z_L$ is simulated by using the expressions for the combined chain matrix of the line transformer and OOB-filter. Two cases are compared 1) $Z_L$ calculated from the transmission line version of $Z_{IN}$ and 2) $Z_L$ calculated from the measured input impedance $Z_{IN}$. Again the two sets of results are fairly closed to each other.

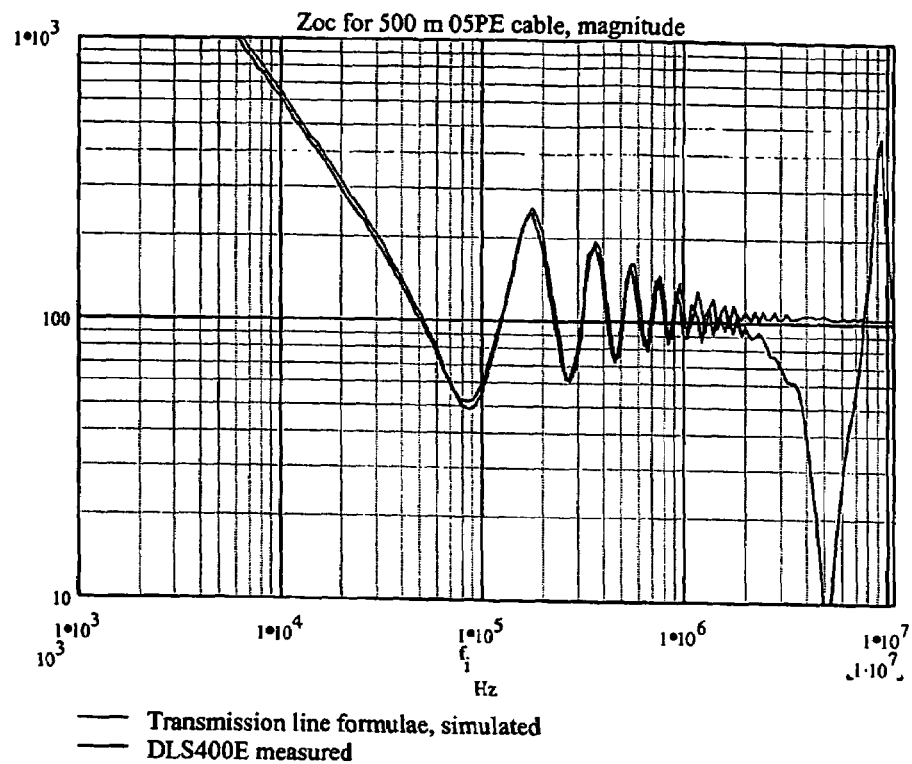
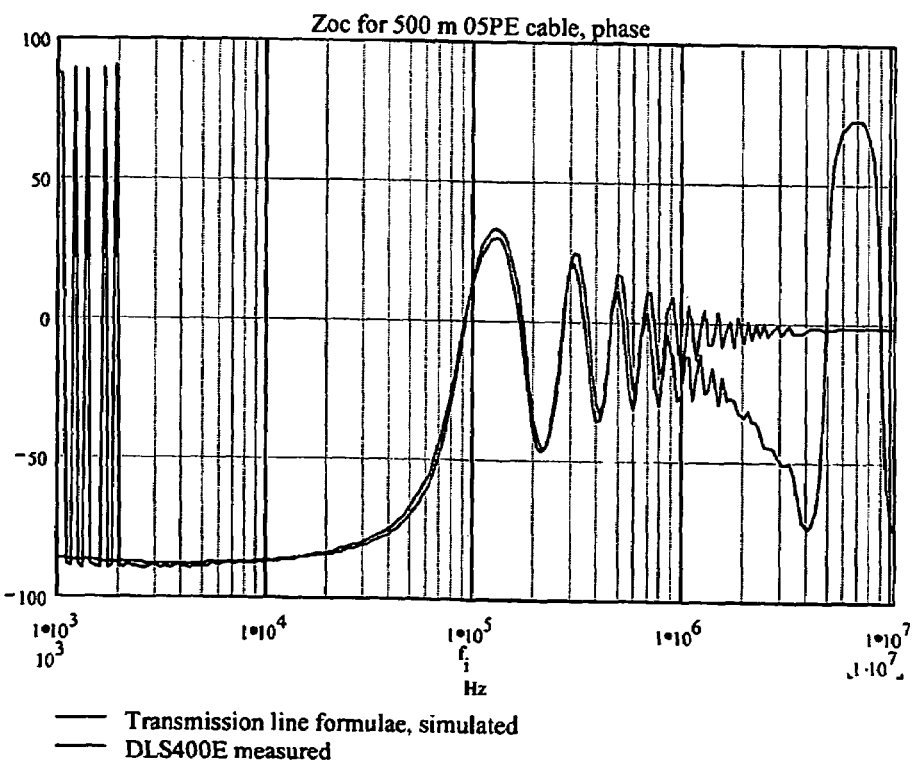
Figure 16: Input impedance $Z_{IN}$ for ETSI loop #2, d = 500 m, $Z_T = \infty$

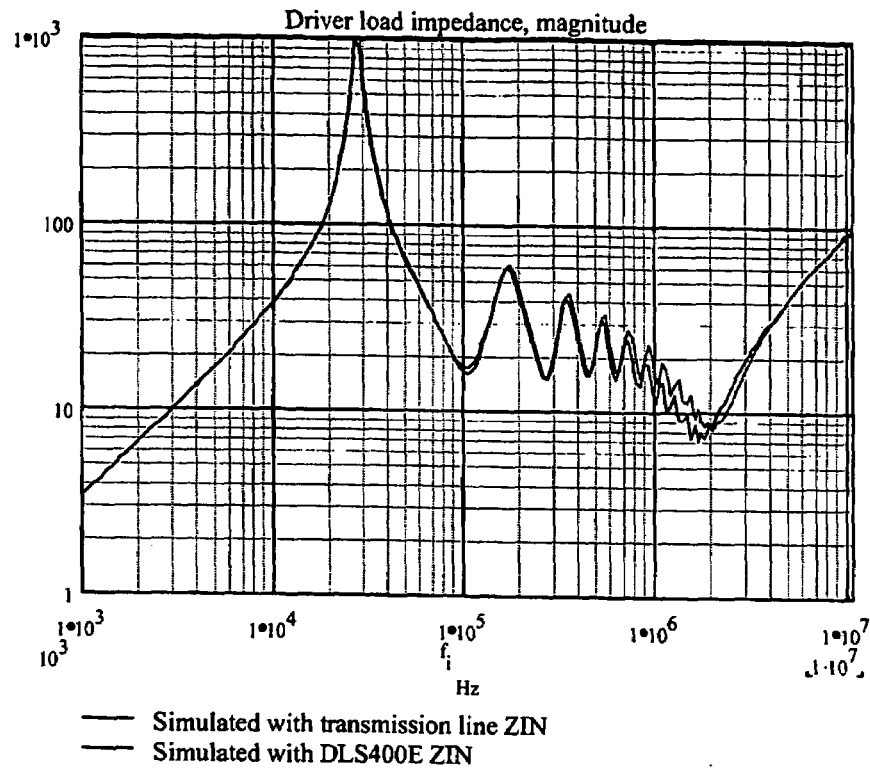
— Simulated with transmission line ZIN
— Simulated with DLS400E ZIN
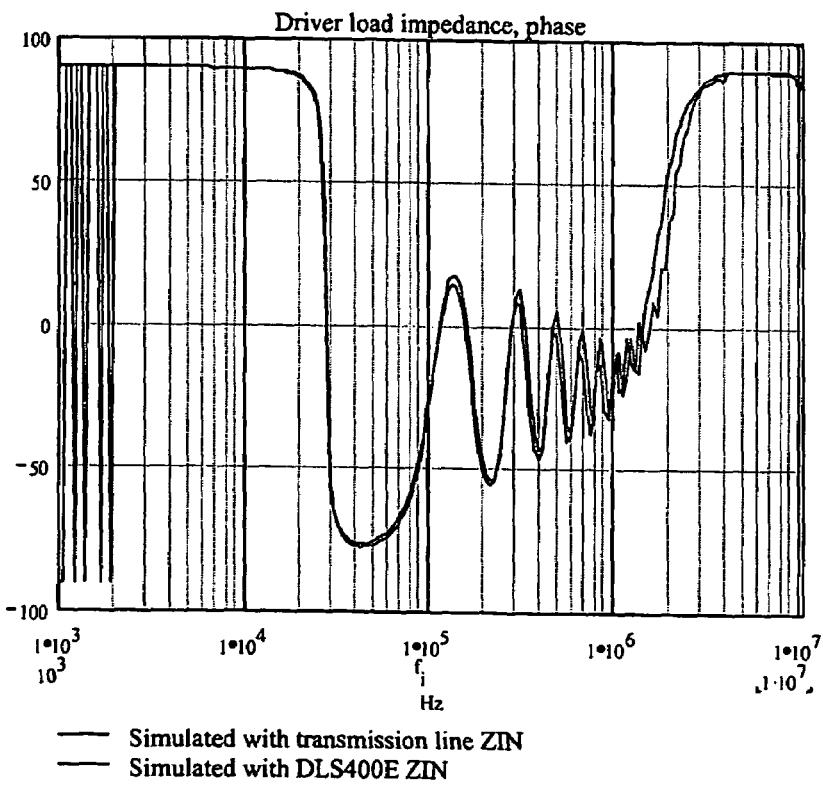
— Simulated with transmission line ZIN
— Simulated with DLS400E ZIN
Figure 17: Driver load impedance $Z_L$ for DAFE 708 with ETSI loop #2, d = 500 m, $Z_T = \infty$

Now the echo transfer function $H_{echo}$ is simulated by using the expression derived in section 2.4. The two results for the driver load impedance $Z_L$ mentioned above are used in the calculation of $H_{echo}$. The simulated versions of $H_{echo}$ are compared with the echo transfer function measured with the network analyzer. The result can be found in Figure 18. The three graphs are close to each other up to 1 MHz. This is probably becomes more evident in Figure 19 where $H_{echo}$ is plotted in a linear scale.

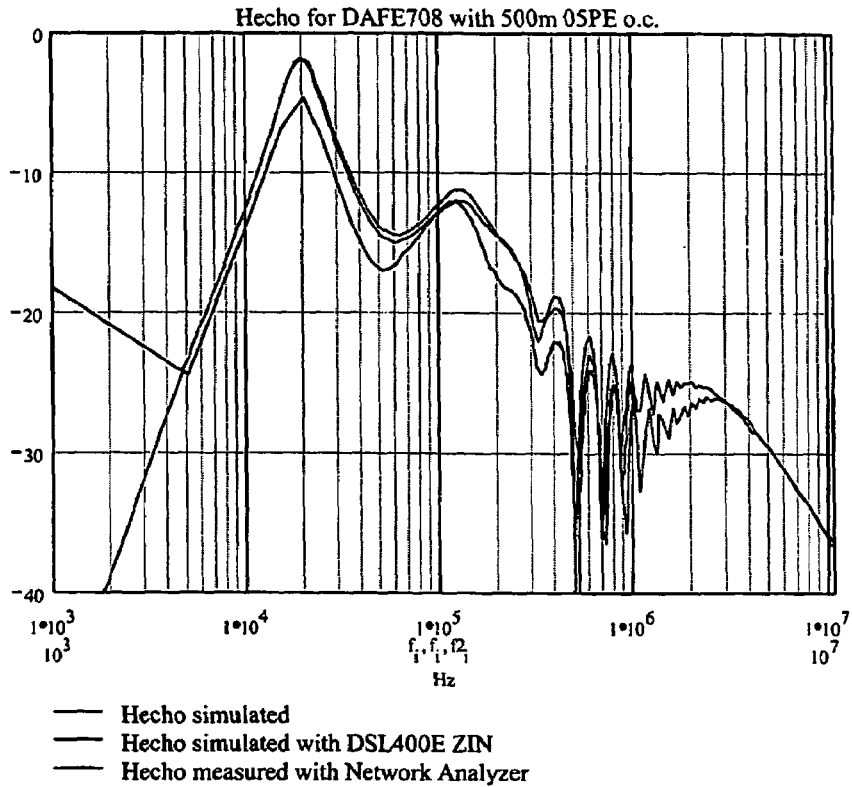

— Hecho simulated
— Hecho simulated with DSL400E ZIN
— Hecho measured with Network Analyzer Figure 18: Echo transfer function for DAFE 708 with ETSI loop #2, d = 500 m, $Z_T = \infty$

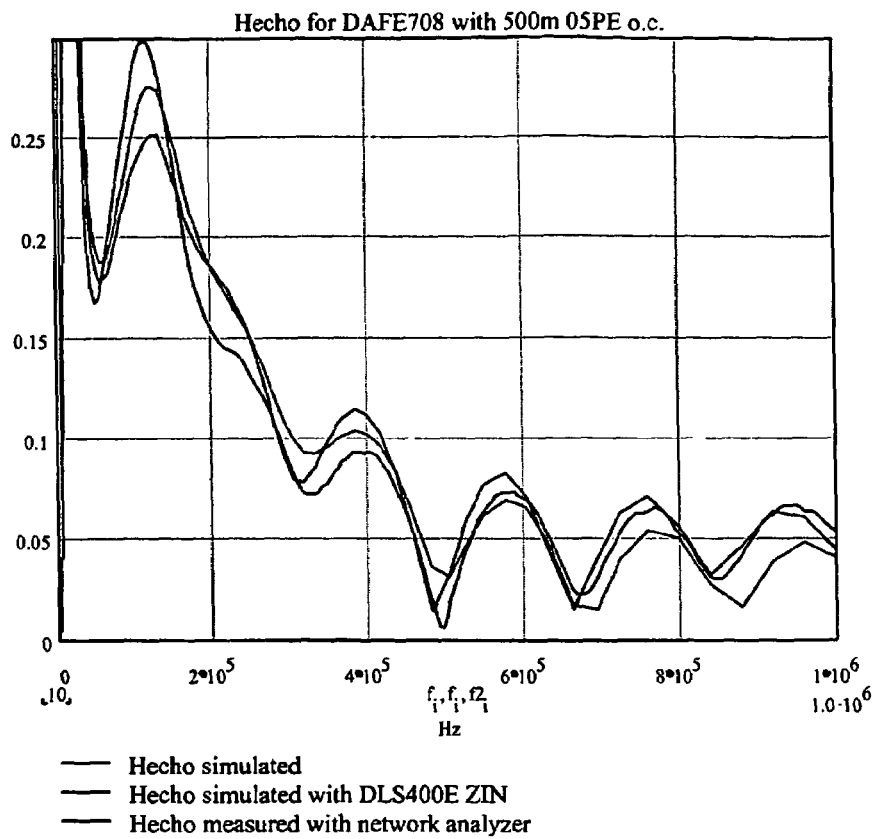

Figure 19: $H_{echo}$ as in Figure 18, but in linear scale

The results seems to indicate that the simulation model provides an echo transfer function, which is reasonably close to what can be measured on the DAFE 708 unit. However if the loop length is increased the agreement between measured and simulated versions of $H_{echo}$ becomes less satisfactory as it appears from Figure 19 and Figure 20. The actual reason for this discrepancy is not fully clarified. One explanation could be that when the loop length increases the load impedance $Z_L$ approaches the scaled sense impedance $K^*Z_S$ leading to an increasing echo loss. With a high echo loss $H_{echo}$ becomes very sensitive even to small changes in the parameter values of the line driver/receiver. The simulation model for PBM 39714 is only a macromodel, which probably not fully characterizes the device.

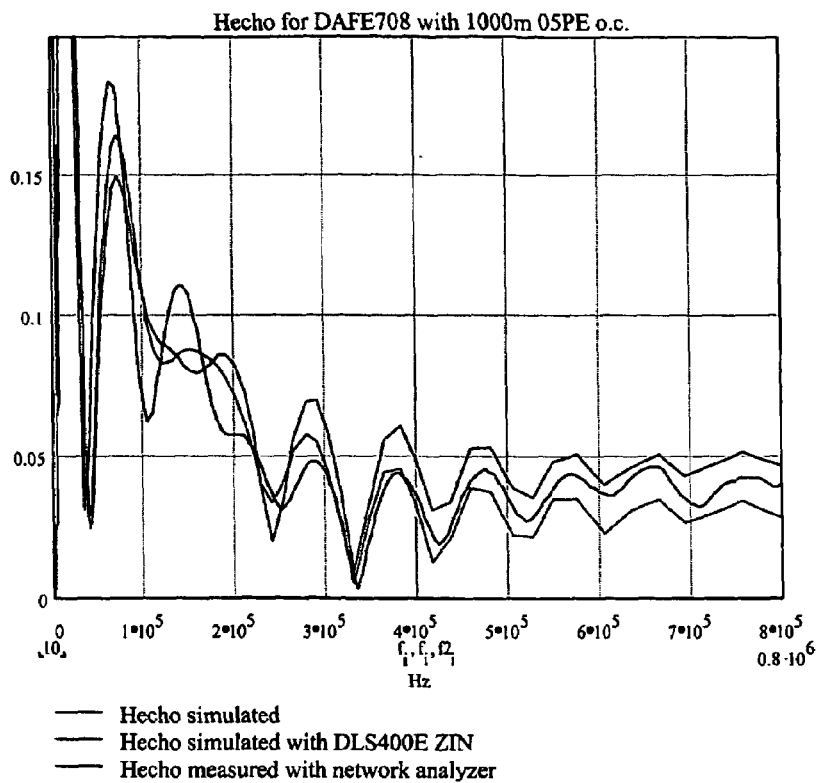
Figure 20: Echo transfer function for DAFE 708 with ETSI loop #2, d = 500 m, $Z_T = \infty$
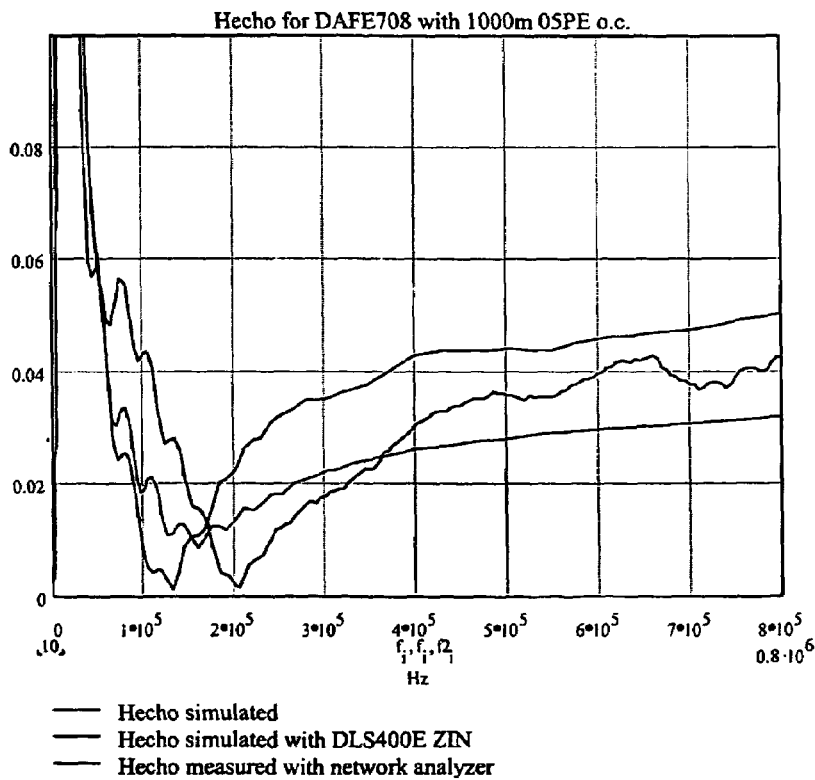

Figure 21: Echo transfer function for DAFE 708 with ETSI loop #2, d = 3000 m, $Z_T = \infty$

REFERENCES

| | | |
|---|---|---|
| [1] | ETSI TS 101 388 | Transmission and Multiplexing (TM); Access transmission systems on metallic access cables; Asymmetric Digital Subscriber Line (ADSL) - European specific requirements, 2002-05. |
| [2] | ANA2812B | Analogue Front End for ADSL with PBM 39714. |
| [3] | 4/0363-FCP105 581 | Derived equations during Loop Test and Qualification workshop 2002-03-21. |
| [4] | ANA3255A | SELT using the Echo Impulse Response. |

The invention claimed is:

1. A method in a single-ended loop test, SELT, of a signal line, the method including:
    connecting a communication equipment to a remote end of the signal line;
    connecting a test device to a near end of the signal line, wherein
    the communication equipment transmits intermittent handshake signals on the signal line from the communication equipment to the test device;
    detecting the handshake signals in the test device;
    sending a halting message from the test device to the communication equipment to halt the handshake signals for a first time interval of predetermined duration;
    performing the SELT measurement during the first time interval, said performing step including:
        sending a loop test signal on the signal line from the test device to the communication equipment; and
        receiving at the test device, a reflected loop test signal; and
    determining properties of the signal line based on characteristics of the loop test signal and the reflected loop test signal.

2. The method according to claim 1, wherein the SELT measurement is not completed during the first time interval, and the method further comprises:
    sending a second halting message from the test device to the communication equipment to halt the handshake signals for a second time interval; and
    completing the SELT measurement in the second time interval.

3. The method according to claim 1, wherein the test device is a transceiver for communication purposes.

4. The method according to claim 3, wherein a calibration process is performed for the transceiver for communication purposes, the method including:
    selecting a transceiver having the same type of hardware as said transceiver for communication purposes and including the transceiver for communication purposes;
    connecting at least three impedances each of a predetermined value to a line connection of the selected transceiver;
    generating for the selected transceiver frequency dependent echo transfer functions ($H_{echo}(f)$) utilizing said at least three impedances and test signals($vt_{in}$, $vt_{out}$); and
    generating transceiver model values ($Z_{h0}(f)$, $Z_{hyb}(f)$, $H_\infty(f)$) with the aid of said echo transfer functions ($H_{echo}(f)$) and the corresponding impedance values, said model values including:
        an echo transfer function ($H_\infty(f)$) for the test transceiver with open line connection,
        a transceiver impedance value ($Z_{h0}(f)$) as seen from the line side, and
        a product ($Z_{h0}(f)$) of said transceiver impedance value ($Z_{hyb}(f)$) and an echo transfer function ($H_0(f)$) for the transceiver with shortcut line connection.

5. The method according to claim 4 including storing the transceiver model values ($Z_{h0}(f)$, $Z_{hyb}(f)$, $H_\infty(f)$) for performing the calibration process.

6. The method according to claim 4 including storing the transceiver model values ($Z_{h0}(f)$, $Z_{hyb}(f)$, $H_\infty(f)$) in said transceiver for communication purposes.

7. A system for performing a single-ended loop test, SELT, of a signal line, the system comprising:
    a test device having connections for a near end of the signal line;
    a receiving device in the test device for detecting intermittent handshake signals received on the signal line from a communication equipment at a remote end of the signal line, and for receiving a reflected loop test signal;
    a sending device in the test device for transmitting a halting message to the communication equipment, and for transmitting the loop test signal to the communication equipment, wherein the halting message halts the handshake signals from the communication equipment for a first time interval of predetermined duration; and
    means for determining properties of the signal line based on characteristics of the loop test signal and the reflected loop test signal;
    wherein the sending device transmits the loop test signal to the signal line and the receiving device receives the reflected loop test signal from the signal line during the first time interval.

8. The system according to claim 7, wherein the sending device in the test device transmits a second halting message to the communication equipment to halt the handshake signals for a second time interval if the SELT measurement is not completed during the first time interval.

9. The system according to claim 7, wherein the test device is a transceiver suitable for communication purposes.

10. The system according to claim 9, wherein in a calibration mode, the system also comprises:
    a measurement device for generating, in the calibration process, calibration values for the transceiver with the aid of at least three impedances and test signals ($vt_{in}$, $vt_{out}$), the impedances having each a predetermined value and being connected to the line connection of the transceiver;
    the measurement device being arranged to generate a frequency dependent echo transfer function ($H_{echo}(f)$) for the test transceiver; and
    the measurement device being arranged to generate transceiver model values ($Z_{h0}(f)$, $Z_{hyb}(f)$, $H_\infty(f)$) with the aid of said echo transfer function ($H_{echo}(f)$) and the corresponding impedance values, said model values including:
        an echo transfer function ($H_\infty(f)$) for the transceiver with open line connection,
        a transceiver impedance value ($Z_{hyb}(f)$) as seen from the line side, and
        a product $Z_{h0}(f)$ of said transceiver impedance value ($Z_{hyb}(f)$) and an echo transfer function ($H_0(f)$) for the transceiver with shortcut line connection.

11. The system according to claim 10, further including a memory for storing the transceiver model values ($Z_{h0}(f)$, $Z_{hyb}(f)$, $H_\infty(f)$).

* * * * *